US012592193B2

(12) United States Patent
He et al.

(10) Patent No.: US 12,592,193 B2
(45) Date of Patent: Mar. 31, 2026

(54) DISPLAY PANEL AND CONTROL METHOD THEREFOR, AND DISPLAY DEVICE

(71) Applicants: Hefei BOE Joint Technology Co., Ltd., Anhui (CN); BOE Technology Group Co., Ltd., Beijing (CN)

(72) Inventors: Min He, Beijing (CN); Can Yuan, Beijing (CN); Pengfei Yin, Beijing (CN); Shuyu Cao, Beijing (CN); Qiang Fei, Beijing (CN)

(73) Assignees: Hefei BOE Joint Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/851,580

(22) PCT Filed: Jan. 16, 2024

(86) PCT No.: PCT/CN2024/072517

§ 371 (c)(1),
(2) Date: Sep. 26, 2024

(87) PCT Pub. No.: WO2024/174770

PCT Pub. Date: Aug. 29, 2024

(65) Prior Publication Data

US 2025/0209981 A1 Jun. 26, 2025

(30) Foreign Application Priority Data

Feb. 22, 2023 (CN) ........................ 202310171621.5

(51) Int. Cl.
*G09G 3/3233* (2016.01)

(52) U.S. Cl.
CPC ... *G09G 3/3233* (2013.01); *G09G 2300/0426* (2013.01); *G09G 2300/0452* (2013.01);
(Continued)

(58) Field of Classification Search
CPC .................................................. G09G 3/3233
See application file for complete search history.

(56) References Cited

U.S. PATENT DOCUMENTS

2015/0154901 A1* 6/2015 Wu ........................ G11C 19/28
345/204
2017/0270852 A1 9/2017 Meitl et al.
(Continued)

FOREIGN PATENT DOCUMENTS

CN 103187025 A 7/2013
CN 109545135 A 3/2019
(Continued)

*Primary Examiner* — Nan-Ying Yang
(74) *Attorney, Agent, or Firm* — IPro, PLLC

(57) ABSTRACT

Provided is a display panel. The display panel includes: a substrate; and a plurality of pixels on the substrate, wherein at least one of the plurality of pixels includes a plurality of sets of sub-pixels, at least one set of the plurality of sets of sub-pixels including a plurality of sub-pixels of a same color; wherein each of the plurality of sub-pixels includes: a drive circuit, coupled to a first control line, a data line, a first power line, and a first node; a compensation circuit, coupled to a second control line, a sensing line, and the first node; a light-emitting element, coupled to the first node and a second power line; and a shielding circuit, connected in series to any light-emitting channel.

20 Claims, 19 Drawing Sheets

(52) U.S. Cl.
CPC ............... *G09G 2300/0842* (2013.01); *G09G 2320/0233* (2013.01); *G09G 2320/046* (2013.01)

(56) References Cited

U.S. PATENT DOCUMENTS

| | | | | |
|---|---|---|---|---|
| 2019/0103456 A1* | 4/2019 | Choi | .................... | H10K 59/131 |
| 2020/0111858 A1* | 4/2020 | Lee | ...................... | H10K 59/121 |
| 2021/0200354 A1* | 7/2021 | Kang | .................... | G06F 3/0416 |
| 2021/0233969 A1* | 7/2021 | Sun | ...................... | H10K 59/122 |

FOREIGN PATENT DOCUMENTS

| | | | |
|---|---|---|---|
| CN | 111179767 | A | 5/2020 |
| CN | 111179848 | A | 5/2020 |
| CN | 112419980 | A | 2/2021 |
| CN | 112509521 | A | 3/2021 |
| CN | 116312360 | A | 6/2023 |
| JP | 2010039363 | A | 2/2010 |

* cited by examiner

DISPLAY PANEL AND CONTROL METHOD THEREFOR, AND DISPLAY DEVICE

This application is a U.S. national stage of international application No. PCT/CN2024/072517, filed on Jan. 16, 2024, which claims priority to Chinese Patent Application No. 202310171621.5, filed on Feb. 22, 2023 and entitled "DISPLAY PANEL, CONTROL METHOD THEREFOR AND DISPLAY DEVICE," the disclosures of which are herein incorporated by references in their entireties.

TECHNICAL FIELD

The present disclosure relates to the technical field of display, and in particular, relates to a display panel and a method for controlling the same, and a display device.

BACKGROUND

In recent years, large-size top-emission transparent organic light-emitting diode (OLED) display panels have become one of research hotspots due to advantages such as a large aperture Ratio and a clear image quality.

SUMMARY

A display panel and a method for controlling the same, and a display device are provided. The technical solutions are as follows.

In some embodiments of the present disclosure, a display panel is provided. The display panel includes:

a substrate, and a plurality of pixels on the substrate; wherein at least one of the plurality of pixels includes a plurality of sets of sub-pixels, at least one set of the plurality of sets of sub-pixels including a plurality of sub-pixels of a same color, wherein each of the plurality of sub-pixels includes:

a drive circuit, coupled to a first control line, a data line, a first power line, and a first node, and configured to control on or off between the first power line and the first node based on a first control signal supplied by the first control line and a data signal supplied by the data line and to control a potential of the first node based on the data signal and a first power signal supplied by the first power line;

a compensation circuit, coupled to a second control line, a sensing line, and the first node, and configured to control on or off between the sensing line and the first node based on a second control signal supplied by the second control line;

a light-emitting element, coupled to the first node and a second power line, and configured to emit light based on the potential of the first node and a second power signal supplied by the second power line; and a shielding circuit, connected in series to any light-emitting channel, and configured to switch off the light-emitting channel in response to a dark spot of the light-emitting element, wherein the light-emitting channel includes a first light-emitting channel and a second light-emitting channel, wherein the first light-emitting channel includes a channel over which the first power line is coupled to the light-emitting element, and the second light-emitting channel includes a channel over which the sensing line is coupled to the light-emitting element.

In some embodiments, the drive circuit includes:

a data write sub-circuit, coupled to the first control line, the data line, and a second node, and configured to control on or off between the data line and the second node based on the first control signal supplied by the first control line;

a drive sub-circuit, coupled to the second node, the first power line, and the first node, and configured to control on or off between the first power line and the first node based on a potential of the second node and to control the potential of the first node based on the potential of the second node and the first power signal; and an adjustment sub-circuit, coupled to the second node and the first node, and configured to adjust the potential of one of the second node and the first node based on the potential of the other of the second node and the first node;

wherein the first light-emitting channel further includes the drive sub-circuit.

In some embodiments, the shielding circuit is connected in series between the first power line and the drive sub-circuit.

In some embodiments, the data write sub-circuit includes: a data write transistor, the drive sub-circuit includes a drive transistor, the adjustment sub-circuit includes a storage capacitor, and the compensation circuit includes a compensation transistor, wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to one terminal of the shielding circuit, the other terminal of the shielding circuit is coupled to the first power line, and a second electrode of the drive transistor is coupled to the first node;

one terminal of the storage capacitor is coupled to the first node, and the other terminal of the storage capacitor is coupled to the second node; and a gate electrode of the compensation transistor is coupled to the second control line, a first electrode of the compensation transistor is coupled to the sensing line, and a second electrode of the compensation transistor is coupled to the first node.

In some embodiments, the second light-emitting channel further includes the compensation circuit, wherein the shielding circuit is connected in series between the light-emitting element and the compensation circuit.

In some embodiments, the data write sub-circuit includes: a data write transistor, the drive sub-circuit includes a drive transistor, the adjustment sub-circuit includes a storage capacitor, and the compensation circuit includes a compensation transistor, wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to the first power line, and a second electrode of the drive transistor is coupled to the first node;

one terminal of the storage capacitor is coupled to the first node, and the other terminal of the storage capacitor is coupled to the second node; and a control electrode of the compensation transistor is coupled to the second control line, a first electrode of the compensation transistor is coupled to the sensing line, a second electrode of the compensation transistor is coupled to one terminal of the shielding circuit, and the other terminal of the shielding circuit is coupled to the first node.

In some embodiments, the shielding circuit includes a shielding resistor.

In some embodiments, in a direction parallel to a bearing face of the substrate, at least one terminal of the shielding resistor includes a rib structure, wherein a recess indented towards a side of the shielding resistor in a direction perpendicular to the substrate is formed in the rib structure.

In some embodiments, in the direction parallel to the bearing face of the substrate, the shielding resistor includes a first structure and a second structure, wherein a distance between a side, away from the substrate, of the second structure and the substrate is greater than a distance between a side, away from the substrate, of the first structure and the substrate.

In some embodiments, the first structure is disposed on two sides of the second structure, and is configured to connect the second structure in series to any light-emitting channel; and the first structure includes the rib structure, and a recess indented towards a center of the first structure is formed in each of two sides of the first structure in the direction parallel to the bearing face of the substrate.

In some embodiments, the first structure includes a plurality of first film layers sequentially laminated in a direction away from the substrate, and the second structure includes a plurality of second film layers sequentially laminated in the direction away from the substrate, wherein at least one of the plurality of first film layers and the plurality of second film layers is disposed on a same layer as a film layer in each of the plurality of sub-pixels.

In some embodiments, each of the plurality of sub-pixels includes a gate metal layer, a source-drain metal layer, a planarization layer, an anode layer, a pixel definition layer, a light-emitting layer, and a cathode layer that are sequentially laminated in the direction away from the substrate, wherein the cathode layer and the anode layer are both made of a transparent material;

the first structure includes five first film layers, wherein a first first film layer and a third first film layer are made of a same material as the anode layer, a second first film layer is made of a same material as the gate metal layer, a fourth first film layer is disposed on a same layer as the light-emitting layer, and a fifth first film layer is disposed on a same layer as the cathode layer; and the first structure is lapped with the source-drain metal layer through a connection hole; and the second structure includes three second film layers, wherein a first second film layer is disposed on a same layer as the planarization layer, a second second film layer is disposed on a same layer as the light-emitting layer, and a third second film layer is disposed on a same layer as the cathode layer.

In some embodiments, the plurality of pixels are arranged in an array, and the plurality of sub-pixels in each two adjacent sets of the plurality of sets of sub-pixels are arranged alternately in a pixel column direction.

In some embodiments of the present disclosure, a method for controlling a display panel is provided. The method is applicable to the display panel in any above embodiments, and in the display panel, a shielding circuit in each of a plurality of sub-pixels is connected in series to a first light-emitting channel over which a first power line is coupled to a light-emitting element. The method includes:

in response to determining that a dark spot does not occur in the display panel, supplying a first power signal at a first potential to the first power line, and supplying a second power signal at a second potential to a second power line; or in response to determining that a dark spot occurs in the display panel, supplying a first power signal at a second potential to the first power line, supplying a second power signal at a first potential to a second power line, supplying a first control signal at the first potential to a first control line, supplying a second control signal at the second potential to a second control line, and supplying a data signal at the first potential to a data line, wherein a drive circuit controls, based on the first control signal and the data signal, the first power line to be connected to a first node, and a compensation circuit controls, based on the second control signal, a sensing line to be disconnected from the first node.

In some embodiments of the present disclosure, a method for controlling a display panel is provided. The method is applicable to the display panel in any above embodiments, and in the display panel, a shielding circuit in each of a plurality of sub-pixels is connected in series to a first light-emitting channel over which a sensing line is coupled to a light-emitting element; the method including:

in response to determining that a dark spot does not occur in the display panel, supplying a first power signal at a first potential to a first power line, and supplying a second power signal at a second potential to a second power line; or in response to determining that a dark spot occurs in the display panel, supplying a first power signal at a second potential to a first power line, supplying a second power signal at a first potential to a second power line, supplying a sensing signal at the second potential to the sensing line, sequentially supplying a first control signal at the first potential and a first control signal at the second potential to a first control line, supplying a second control signal at the first potential to a second control line, and supplying a data signal at the second potential to a data line, wherein a drive circuit controls, based on the first control signal and the data signal, the first power line to be disconnected from a first node, and a compensation circuit controls, based on the second control signal, the sensing line to be connected to the first node.

In some embodiments of the present disclosure, a display device is provided. The display device includes: a power supply assembly, and the display panel in any above embodiments; wherein the power supply assembly is coupled to the display panel and is configured to supply power to the display panel.

BRIEF DESCRIPTION OF DRAWINGS

For clearer description of the technical solutions according to the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
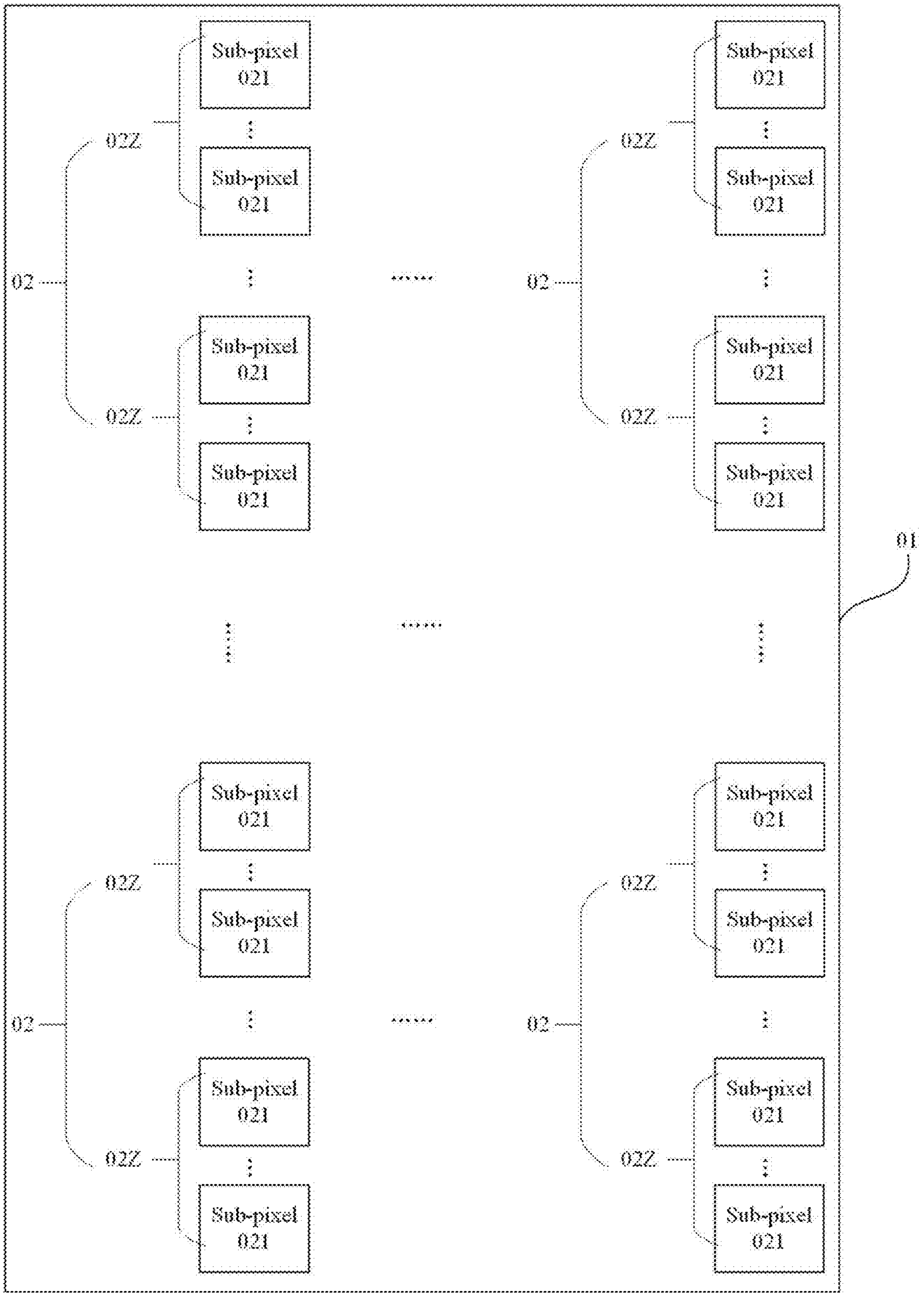
FIG. 1 is a schematic structural diagram of a display panel according to some embodiments of the present disclosure.

For clearer descriptions of the objects, technical solutions, and advantages of the present disclosure, the embodiments of the present disclosure are described in detail hereinafter in combination with the accompanying drawings.

It should be noted that transistors in all embodiments of the present disclosure can be thin-film transistors, field-effect transistors, or other devices with similar characteristics. According to the roles in the circuit, the transistors in the embodiments of the present disclosure are mainly switch transistors. As a source electrode and a drain electrode of the switch transistor used herein are symmetrical, the source electrode and the drain electrode are exchangeable. In the embodiments of the present disclosure, the source electrode is referred to as a first electrode, and the drain electrode is referred to as a second electrode. According to the shape in the drawings, a middle terminal of the transistor is specified as a control electrode, which is also referred to as a gate electrode, a signal input terminal is the source electrode, and the signal output terminal is the drain electrode. In addition, the switch transistor in the embodiments of the present disclosure includes a P-type switch transistor or an N-type switch transistor. The P-type switch transistor is turned on in the case that the gate electrode is at a low level and turned off in the case that the gate electrode is at a high level, and the N-type switch transistor is turned on in the case that the gate electrode is at a high level and turned off in the case that the gate electrode is at a low level. In addition, a plurality of signals in the embodiments of the present disclosure correspond to a first potential and a second potential. The first potential and the second potential only represent that the potential of the signal has two state, and do not represent that the first potential or the second potential herein has a specific value.

Currently, the transparent OLED display panel generally includes a substrate and a plurality of pixels on the substrate. Each of the plurality of pixels includes a plurality of sub-pixels. In generally, each of the plurality of pixels includes three sub-pixels, that is, a red sub-pixel, a blue sub-pixel, and a green sub-pixel. Each of the plurality of sub-pixels includes a pixel circuit and an OLED light-emitting element. The pixel circuit is configured to drive the OLED light-emitting element to emit light. In addition, the OLED light-emitting element includes an anode layer, a light-emitting layer, and a cathode layer that are sequentially laminated in a direction away from the substrate. The cathode layer is generally formed by a sputter process.

However, affected by the sputter process, the currently formed cathode layer is prone to abnormal problems such as particles, such that the cathode layer is directly connected to the anode layer. Thus, dark spots occur in the OLED light-emitting element, and a yield of a product is poor.

Currently, for the dark spot in the light-emitting element in the transparent display panel, aging timing is designed to cooperate with the pixel circuit of the current 3T1C two-gate structure (that is, including three transistors and a capacitor and coupled with two gate lines) to burn out the particle at the dark spot. However, tests show that the method may cause more dark spots remaining in the transparent display panel, such that the particle cannot be reliably burned out, and mass production conditions are not met. On this basis, the embodiments of the present disclosure provide a display panel. The display panel can be self-disconnected at more dark spots, shield a high current caused by the dark spots, and avoid the impact of the high current on the product reliability, such that the service life of the display panel is improved, and the mass production conditions are met.

FIG. 1 is a schematic structural diagram of a display panel according to some embodiments of the present disclosure. As shown in FIG. 1, the display panel includes a substrate 01 and a plurality of pixels 02 on the substrate 01.

At least one of the plurality of pixels 02 includes a plurality of sets of sub-pixels 02Z. At least one set of the plurality of sets of sub-pixels 02Z includes a plurality of sub-pixels 021 of a same color. In some embodiments, colors of sub-pixels 021 in various sets of sub-pixels 02Z in at least one of the plurality of pixels 02 are different.

For example, for two sets of sub-pixels 02Z in a pixel 02, a plurality of sub-pixels 021 in one of the two sets of sub-pixels 02Z are red sub-pixels, and a plurality of sub-pixels 021 in one of the two sets of sub-pixels 02Z are green sub-pixels. That is, the pixel 02 includes a plurality of red sub-pixels 021 and a plurality of green sub-pixels 021. In some embodiments, a pixel 02 includes at least two sets of sub-pixels 02Z in which colors of the sub-pixels 021 are the same.

In the currently traditional display panel, using the red sub-pixel 021 and the green sub-pixel 021 as an example, each pixel 02 generally includes a red sub-pixel 021 and a green sub-pixel 021. That is, concept of the set of sub-pixels 02Z is not required. Thus, it can be seen based on above description that a traditional sub-pixel 021 is segmented into a plurality of sub pixels 021 in the embodiments of the present disclosure by a sub-pixel segmentation method. In this way, a plurality of sub-pixels 021 of a same color in the pixel 02 are individually controlled to emit light. Furthermore, in the case that a sub-pixel 021 in the plurality of sub-pixels 021 of the same color cannot emit light normally due to a dark spot, the display grayscale is normal by controlling other sub-pixels 021 than the sub-pixel 021 that cannot emit light normally to reliably emit light, and thus the display effect of the display panel is great.

Figure 2:
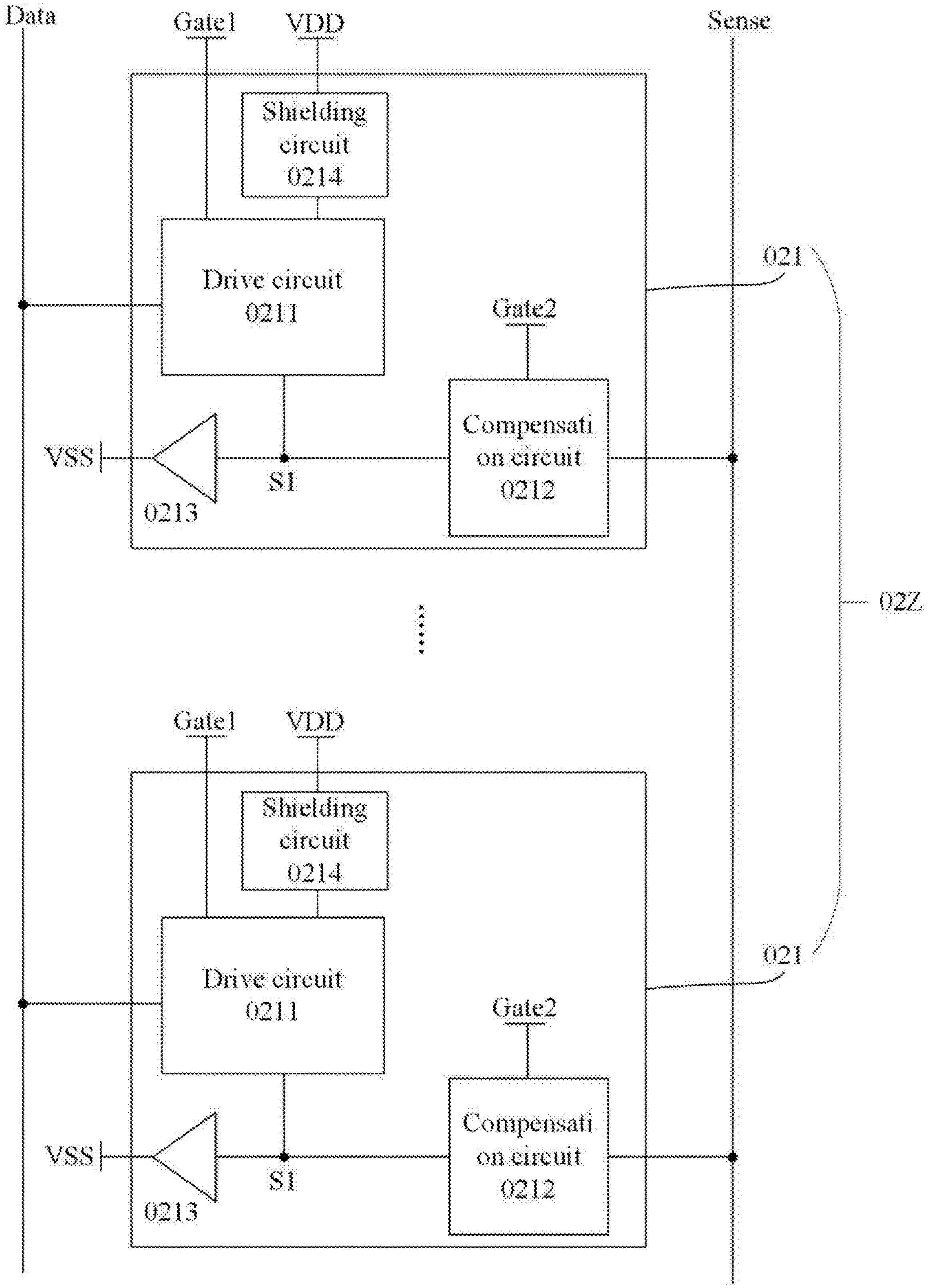
FIG. 2 is a schematic structural diagram of a set of sub-pixels according to some embodiments of the present disclosure.
Figure 3:
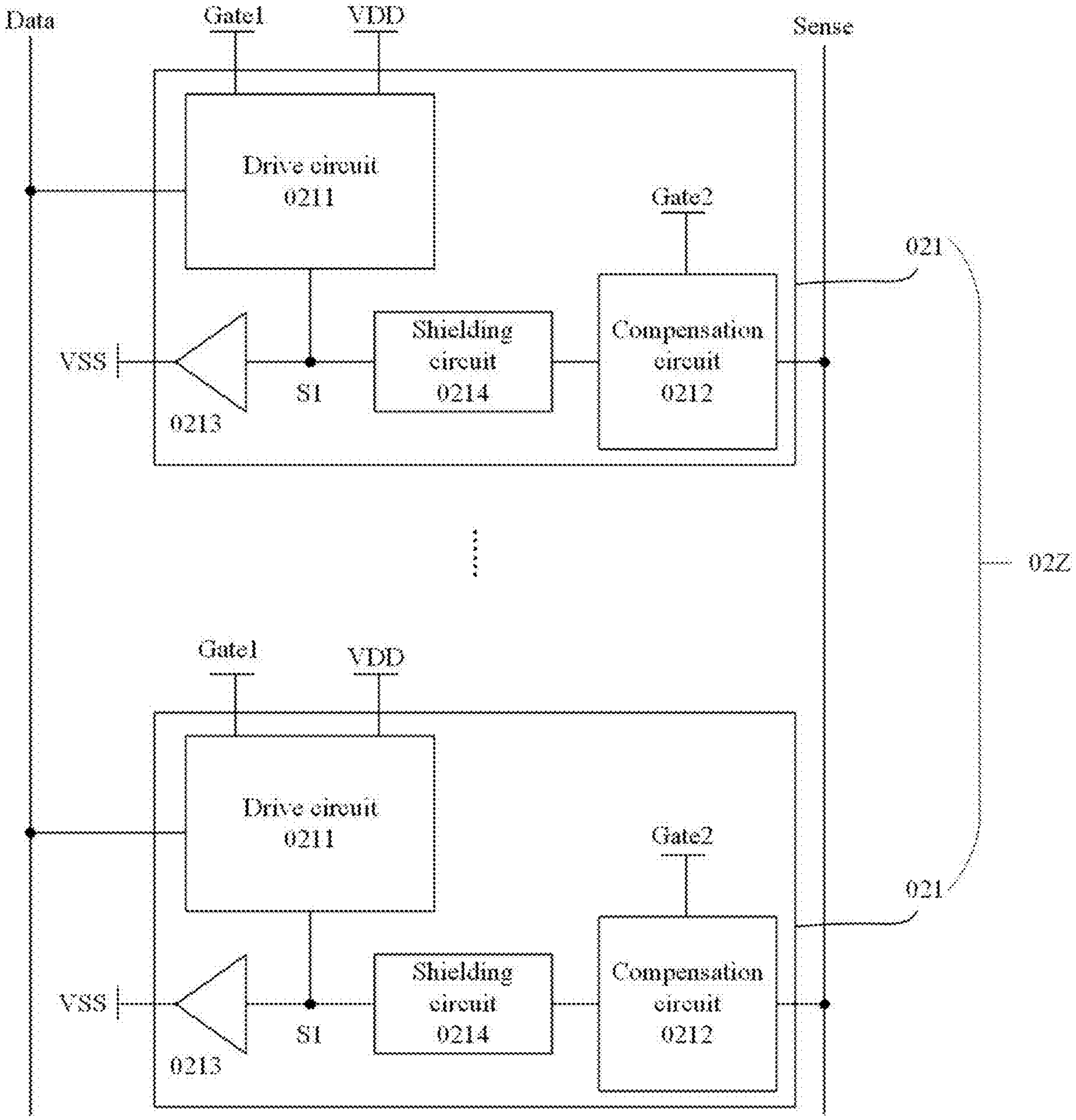
FIG. 3 is a schematic structural diagram of a set of sub-pixels according to some embodiments of the present disclosure.

Based on FIG. 1, using one set of sub-pixels 02Z in a pixel 02 as an example, it can be seen referring to the schematic structural diagrams of the sub-pixels in FIG. 2 and FIG. 3 that each sub-pixel 021 includes a drive circuit 0211, a compensation circuit 0212, a light-emitting element 0213, and a shielding circuit 0214. The drive circuit 0211, the compensation circuit 0212, the light-emitting element 0213, and the shielding circuit 0214 are collectively referred to a pixel circuit.

The drive circuit 0211 is coupled to a first control line Gate 1 (or referred to as a first gate line), a data line Data, a first power line VDD, and a first node S1, and configured to control on or off between the first power line VDD and the first node S1 based on a first control signal supplied by the first control line Gate 1 and a data signal supplied by the data line Data and to control a potential of the first node S1 based on the data signal and a first power signal supplied by the first power line VDD.

For example, in the case that the potential of the first control signal supplied by the first control line Gate 1 is the first potential, and the potential of the data signal supplied by the data line Data is the first potential, the drive circuit 0211 controls the first power line VDD to be connected to the first node S1. Furthermore, the drive circuit 0211 generates a drive signal based on the data signal at the first potential and the first power signal supplied by the first power line VDD and transmits the drive signal to the first node S1. In the case that the potential of the first control signal supplied by the first control line Gate 1 is the second potential, and/or the potential of the data signal supplied by the data line Data is the second potential, the drive circuit 0211 controls the first power line VDD to be disconnected from the first node S1.

In some embodiments of the present disclosure, the first potential is a valid potential, the second potential is an invalid potential, and the valid potential is a high potential relative to the invalid potential. In some embodiments, the valid potential is a low potential relative to the invalid potential.

The compensation circuit 0212 is coupled to a second control line Gate 2 (or referred to as a second gate line), a sensing line Sense, and the first node S1, and configured to control on or off between the sensing line Sense and the first node S1 based on a second control signal supplied by the second control line Gate 2.

For example, in the case that the potential of the second control signal supplied by the second control line Gate 2 is the first potential, the compensation circuit 0212 controls the sensing line Sense to be connected to the first node S1. In this case, the sensing line Sense transmits a sensing signal to the first node S1, or, the sensing line Sense acquires a potential of the first node S1. The sensing signal is generally for resetting the first node S1. The potential of the first node S1 acquired by the sensing line Sense is for a source drive circuit to compensate the data signal.

The light-emitting element 0213 is coupled to the first node S1 and a second power line VSS, and configured to emit light based on the potential of the first node S1 and a second power signal supplied by the second power line VSS.

For example, the light-emitting element 0213 emits light under a potential difference between the drive signal received by the first node S1 and the second power signal supplied by the second power line VSS.

In some embodiments, it can be seen referring to FIG. 2 that the light-emitting element 0213 is coupled to the first node S1 through an anode of the light-emitting element 0213, and is coupled to the second power line VSS through a cathode of the light-emitting element 0213. On this basis, the light-emitting element 0213 emits light reliably on the basis that the potential of the drive signal received by the first node S1 is higher than the potential of the second power signal.

As the drive signal is generated based on the first power signal supplied by the first power line VDD, in the case that the potential of the first power signal supplied by the first power line VDD is higher than the potential of the second power signal supplied by the second power line VSS, that is, the potential of the first power signal is the first potential and the potential of the second power signal is the second potential, the light-emitting element 0213 is loaded with a forward voltage and reliably emits light; and in the case that the potential of the first power signal is the second potential and the potential of the second power signal is the first potential, that is, the potential of the first power signal is lower than the potential of the second power signal, the light-emitting element 0213 is loaded with a reverse voltage. Similarly, in the case that the sensing line Sense transmits the sensing signal to the first node S1, the light-emitting element 0213 is loaded with a reverse voltage in the case that the potential of the sensing signal from the sensing line Sense to the first node S1 is the second potential and the potential of the second power signal is the first potential, that is, the potential of the sensing signal is lower than the potential of the second power signal. In other words, in the case that the potential of the first node S1 is lower than the potential of the second power signal, the light-emitting element 0213 is loaded with a reverse voltage.

The shielding circuit 0214 is connected in series to any light-emitting channel. In some embodiments of the present disclosure, the light-emitting channel includes the following first light-emitting channel and second light-emitting channel.

The first light-emitting channel includes a channel over which the first power line VDD is coupled to the light-emitting element 0213, that is, a channel over which the first power line VDD is coupled to the light-emitting element 0213 through the drive circuit 0211.

The second light-emitting channel includes a channel over which the sensing line Sense is coupled to the light-emitting element 0213, that is, a channel over which the sensing line Sense is coupled to the light-emitting element 0213 through the compensation circuit 0212.

For example, referring to FIG. 2, the shielding circuit 0214 is connected in series to the first light-emitting channel over which the first power line VDD is coupled to the light-emitting element 0213. For example, the shielding circuit 0214 is connected in series between the first power line VDD and the drive circuit 0211. One terminal of the shielding circuit 0214 is coupled to the first power line VDD, and the other terminal of the shielding circuit 0214 is coupled to the drive circuit 0211, such that the shielding circuit 0214 is indirectly coupled to the light-emitting element 0213 through the drive circuit 0211. In some embodiments, the shielding circuit 0214 is connected in series between the drive circuit 0211 and the light-emitting element 0213 to be indirectly coupled to the first power line VDD through the drive circuit 0211.

For example, referring to FIG. 3, the shielding circuit 0214 is connected in series to the second light-emitting channel over which the sensing line Sense is coupled to the light-emitting element 0213. For example, the shielding circuit 0214 is connected in series between the compensation circuit 0212 and the light-emitting element 0213. One terminal of the shielding circuit 0214 is coupled to the compensation circuit 0212, and the other terminal of the shielding circuit 0214 is coupled to the light-emitting element 0213, such that the shielding circuit 0214 is indirectly coupled to the sensing line Sense through the compensation circuit 0212. In some embodiments, the shielding circuit 0214 is connected in series between the compensation circuit 0212 and the sensing line Sense to be indirectly coupled to the light-emitting element 0213 through the compensation circuit 0212.

In conjunction with FIG. 2 and FIG. 3, in the embodiments of the present disclosure, the shielding circuit 0214 is configured to switch off the light-emitting channel in response to a dark spot of the light-emitting element 0214. The light-emitting channel refers to a light-emitting channel of the light-emitting element 0214. For example, for the structure shown in FIG. 2, the shielding circuit 0214 connected in series to the first light-emitting channel over which the first power line VDD is coupled to the light-emitting element 0213 is configured to switch off the first light-emitting channel in response to the dark spot of the light-emitting element 0213. Similarly, for the structure shown in FIG. 3, the shielding circuit 0214 connected in series to the second light-emitting channel over which the sensing line Sense is coupled to the light-emitting element 0213 is configured to switch off the second light-emitting channel in response to the dark spot of the light-emitting element 0213.

Furthermore, using the structure shown in FIG. 3 as an example, brief description of the principle of burning out the light-emitting channel is given hereinafter based on the above embodiments. In the case that the dark spot occurs in the display panel, the reverse voltage is supplied to the light-emitting elements 0213. In this case, the light-emitting element 0213 without the particle is equivalent to a diode structure and is not conducted, and the light-emitting element 0213 with the particle is conducted abnormally. Furthermore, the current flows from the second power line VSS into the sensing line Sense through the second light-emitting channel to form a path. In the case that the current is high, some short particles are burned out, and the dark spot restores to be normal. For some particles with good connectivity that cause the anode to be connected to the cathode, the current is flexibly adjusted and cooperates with the shielding circuit 0214 to burn out the particles, and the burnout point is generally the position of the shielding circuit 0214. In other words, the shielding circuit 0214 self-fuses in the case that particles occur in the light-emitting element 0213 to form an open circuit, and thus the dark spot is self-disconnected.

In summary, the embodiments of the present disclosure provide a display panel. At least one pixel in the display panel includes a plurality of sets of sub-pixels. At least one set of sub-pixels includes a plurality of sub-pixels of a same color, and each sub-pixel includes a drive circuit, a compensation circuit, a light-emitting element, and a shielding circuit. The drive circuit and the compensation circuit control the light-emitting element to emit light. The shielding circuit is connected in series to any of a plurality of light-emitting channels of the light-emitting element to switch off the light-emitting channel in response to a dark spot of the light-emitting element. As such, in conjunction with timing settings, the above circuits are used to reliably address the problem of dark spots in the display panel. Furthermore, in the case that the dark spot occurs in sub-pixels of one color in the pixel, sub pixels of the same other colors are driven to emit light, such that a great display effect is ensured. The product yield of the display panel according to the embodiments of the present disclosure is great.

Figure 4:
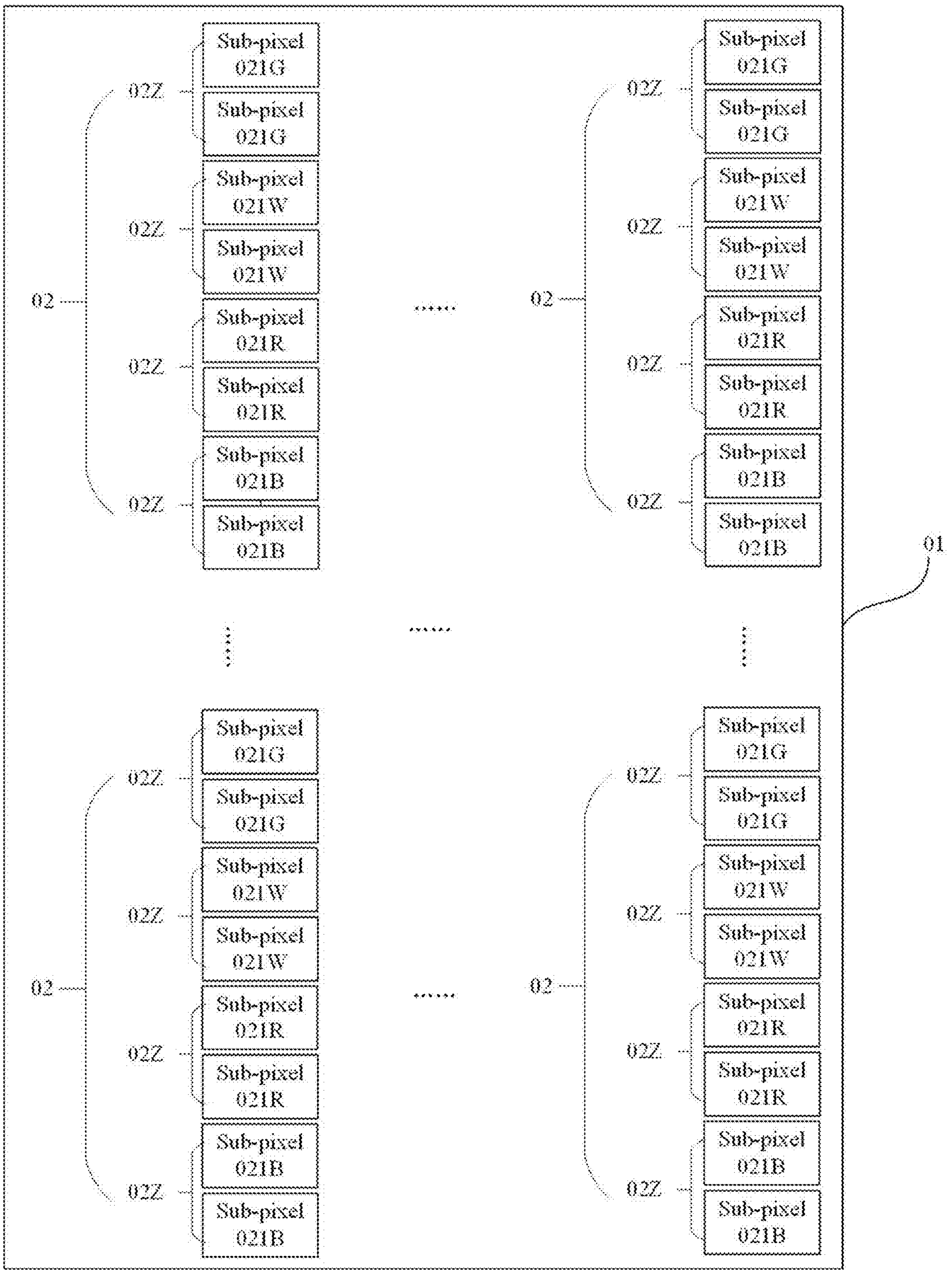
FIG. 4 is a schematic structural diagram of a display panel according to some embodiments of the present disclosure.

In some embodiments, FIG. 4 is a schematic structural diagram of a display panel according to some embodiments of the present disclosure. As shown in FIG. 4, each pixel 02 in the embodiments of the present disclosure includes four sets of sub-pixels 02Z, and each set of sub-pixels 02Z includes two sub-pixels 021 of a same color.

In addition, in the four sets of sub-pixels 02Z in the above embodiments, colors of sub-pixels 021 in various sets of sub-pixels 02Z are different. Correspondingly, for the structure shown in FIG. 4, each pixel 02 includes sub-pixels 021 of four colors, and a number of sub-pixels 021 of each color is two. Illustratively, the following embodiments are illustrated using an example where four sets of sub-pixels 02Z in the structure shown in FIG. 4 include two red sub-pixels 021R, two green sub-pixels 021G, two blue sub-pixels 021B, and two white sub-pixels 021W.

Figure 5:
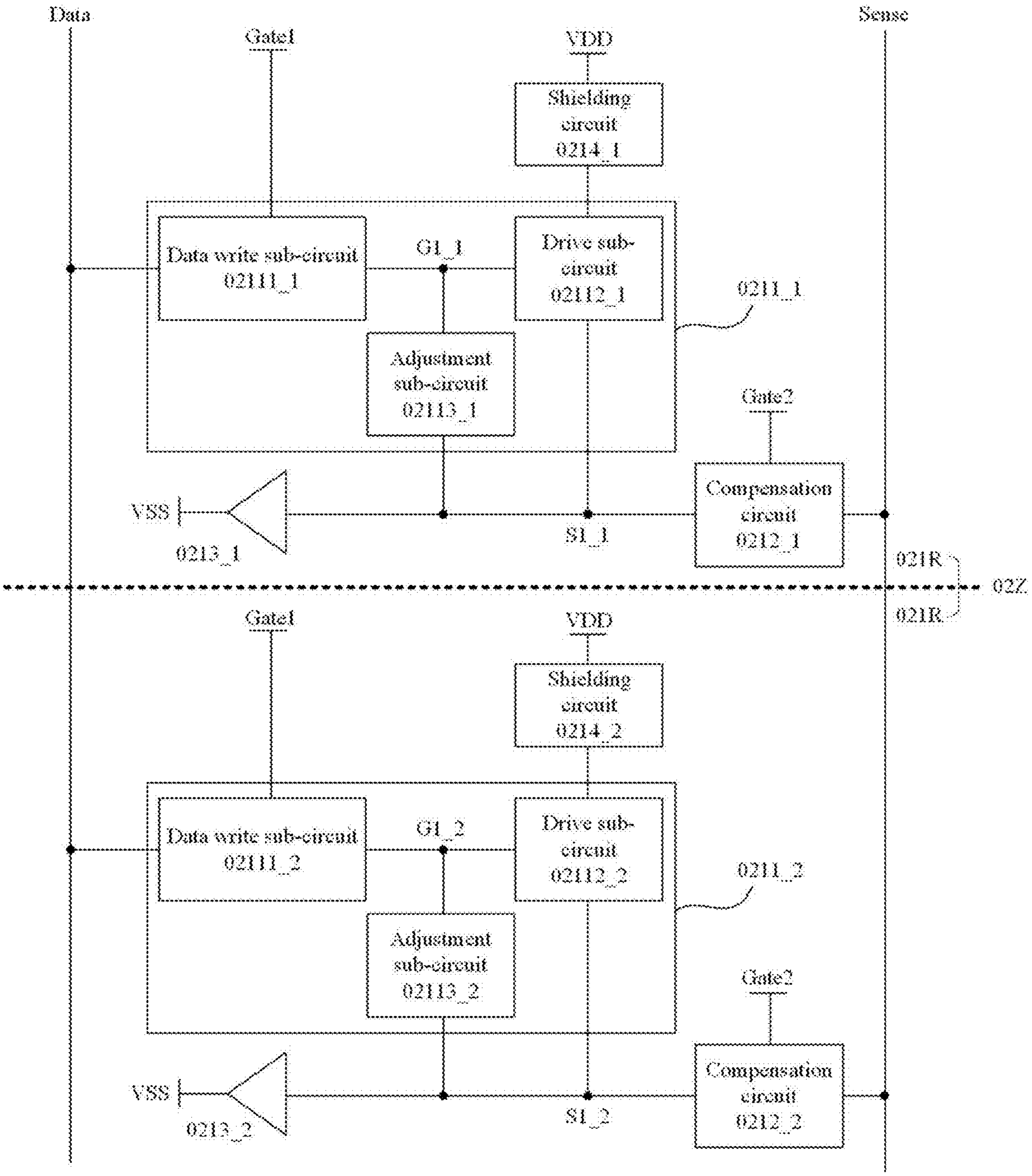
FIG. 5 is a schematic structural diagram of a set of sub-pixels on the basis of FIG. 2.
Figure 6:
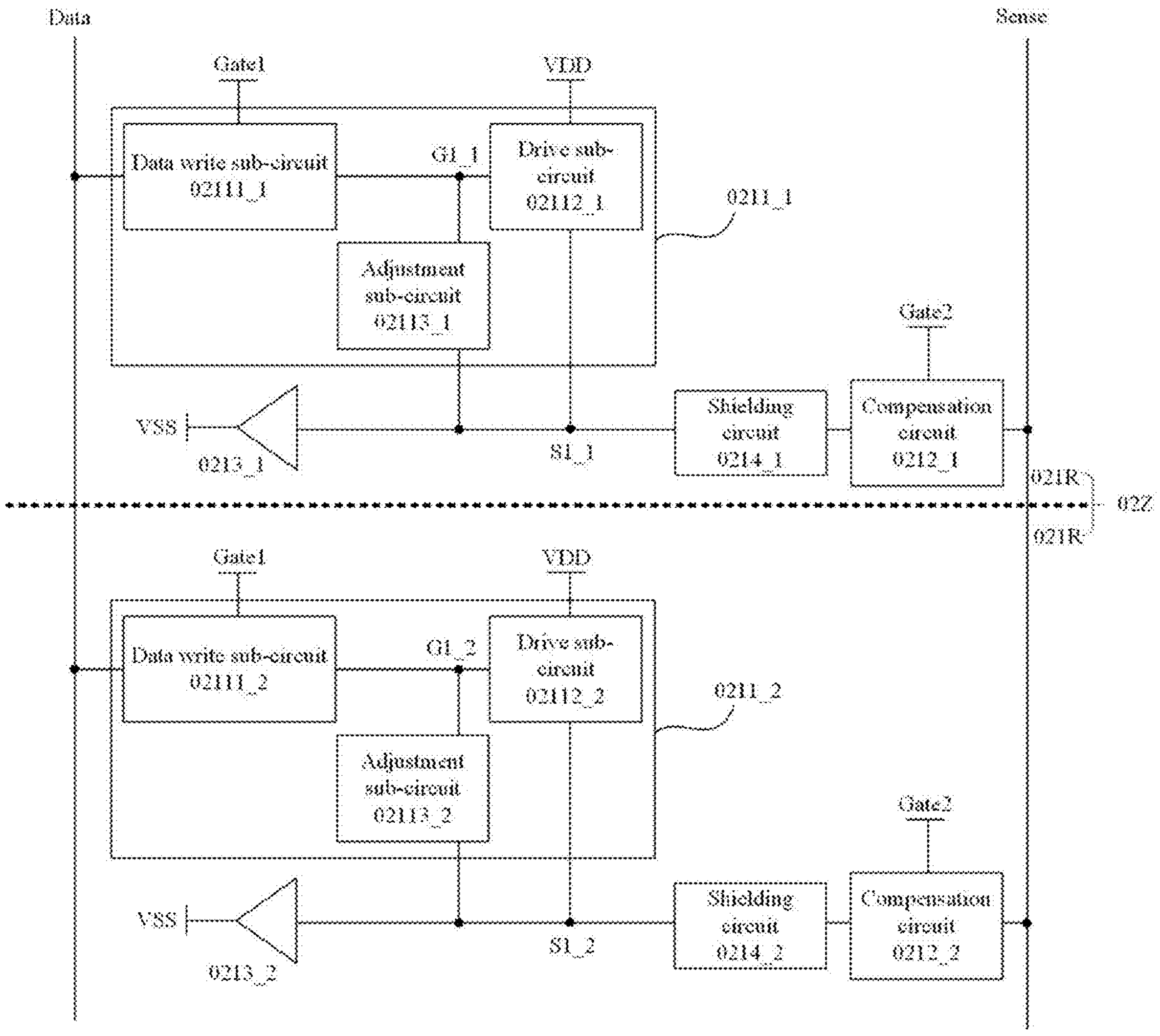
FIG. 6 is a schematic structural diagram of a set of sub-pixels on the basis of FIG. 3.

In some embodiments, using a set of sub-pixels 02Z including two red sub-pixels 021R in the structure shown in FIG. 4 as an example, on the basis of the structure shown in FIG. 2 (that is, the shielding circuit 0214 is connected in series to the first light-emitting channel over which the first power line VDD is coupled to the light-emitting element 0213), FIG. 5 shows a schematic structural diagram of a sub-pixel 021. And on the basis of the structure shown in FIG. 3 (that is, the shielding circuit 0214 is connected in series to the first light-emitting channel over which the sensing line Sense is coupled to the light-emitting element 0213), FIG. 6 shows a schematic structural diagram of a sub-pixel 021. As shown in FIG. 5 and FIG. 6, the drive circuit includes a data write sub-circuit 02111, a drive sub-circuit 02112, and an adjustment sub-circuit 02113.

The data write sub-circuit 02111 is coupled to the first control line Gate1, the data line Data, and a second node G1, and configured to control on or off between the data line Data and the second node G1 based on the first control signal supplied by the first control line Gate1.

For example, in the case that the potential of the first control signal supplied by the first control line Gate1 is the first potential, the data write sub-circuit 02111 controls the data line Data to be connected to the second node G1. In this case, the data line Data transmits the data signal to the second node G1. In addition, the data write sub-circuit 02111 controls the data line Data to be disconnected from the second node G1 in the case that the potential of the first control signal is the second potential.

The drive sub-circuit 02112 is coupled to the second node G1, the first power line VDD, and the first node S1, and configured to control on or off between the first power line VDD and the first node S1 based on a potential of the second node G1 and to control the potential of the first node S1 based on the potential of the second node G1 and the first power signal.

For example, in the case that the potential of the second node G1 is the first potential, the drive sub-circuit 02112 controls the first power line VDD to be connected to the first node S1, and then generates the drive signal based on the potential of the second node G1 and the first power signal supplied by the first power line VDD and transmits the drive signal to the first node S1. In addition, the drive sub-circuit 02112 controls the first power line VDD to be disconnected from the first node S1 in the case that the potential of the second node G1 is the second potential.

The adjustment sub-circuit 02113 is coupled to the second node G1 and the first node S1, and configured to adjust the potential of one of the second node G1 and the first node S1 based on the potential of the other of the second node G1 and the first node S1. For example, the adjustment sub-circuit 02113 adjusts the potential of the first node S1 and the potential of the second node G1 by coupling.

The first light-emitting channel further includes the drive sub-circuit 02112. That is, the first light-emitting channel is a channel over which the first power line VDD is coupled to the light-emitting element 0213 through the drive sub-circuit 02112. That is, in some embodiments, as shown in FIG. 5, in the case that the shielding circuit 0214 is connected in series to the first light-emitting channel, the shielding circuit 0214 is connected in series between the first power line VDD and the drive sub-circuit 02112 in the drive circuit.

For the structure shown in FIG. 6, that is, in some embodiments, as shown in FIG. 6, in the case that the shielding circuit 0214 is connected in series to the second light-emitting channel, and the second light-emitting channel includes the compensation circuit 0212, the shielding circuit 0214 is connected in series between the light-emitting element 0213 and the compensation circuit 0212.

Figure 7:
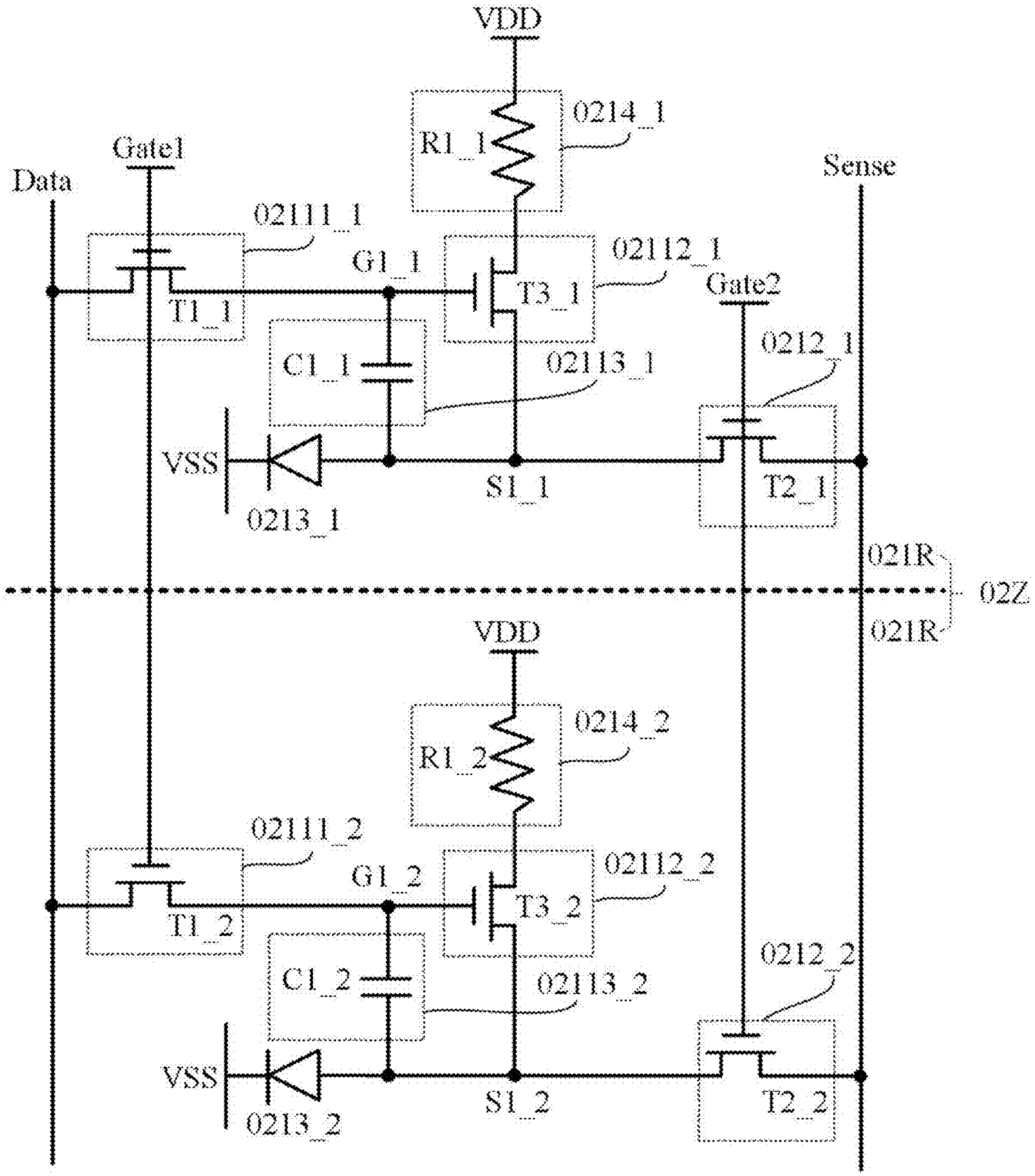
FIG. 7 is a schematic diagram of a circuit structure of a set of sub-pixels on the basis of FIG. 5.
Figure 8:
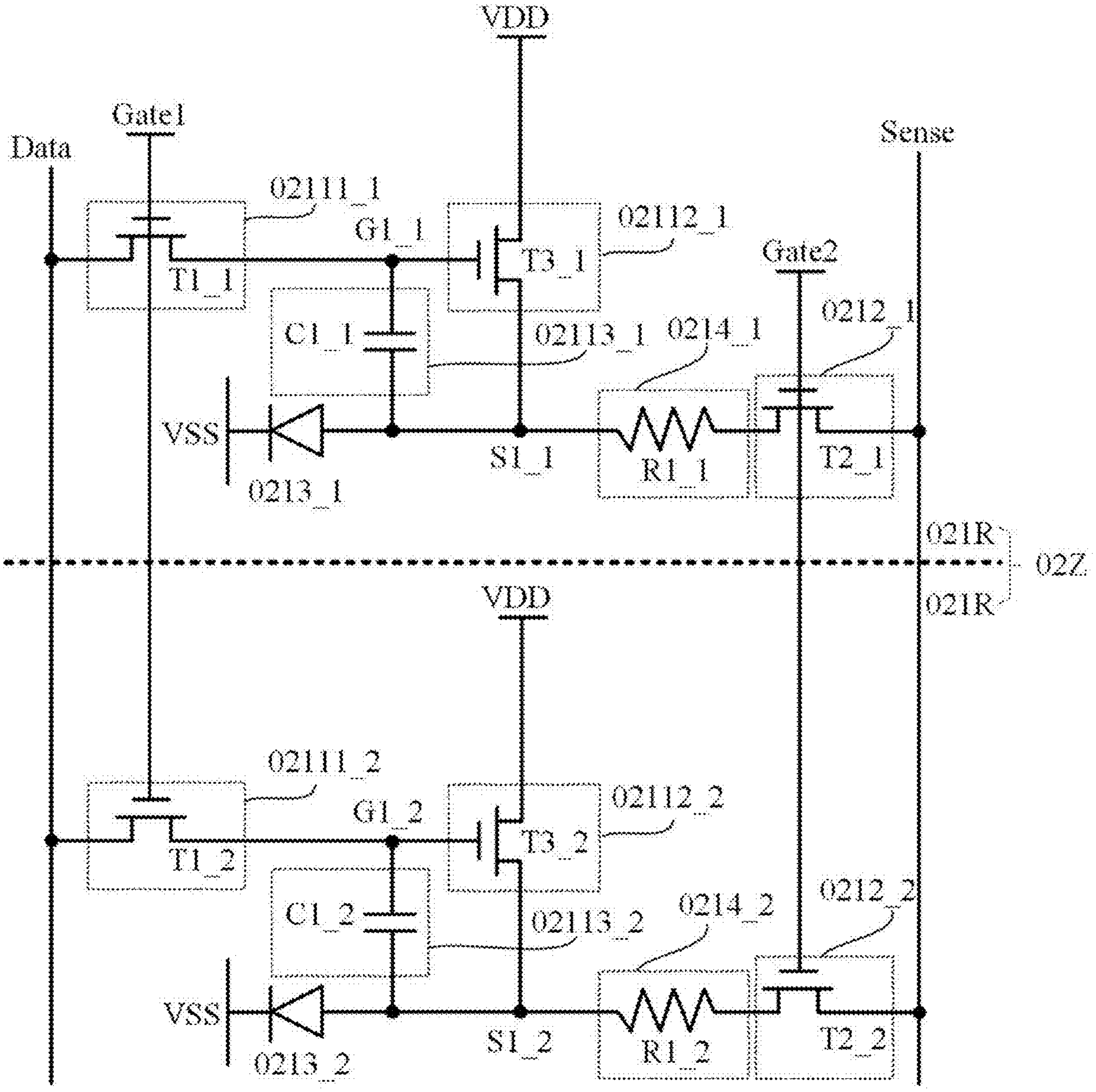
FIG. 8 is a schematic diagram of a circuit structure of a set of sub-pixels on the basis of FIG. 6.

In some embodiments, using the structure shown in FIG. 5 as an example, FIG. 7 is a schematic diagram of a circuit structure of a sub-pixel. Using the structure shown in FIG. 6 as an example, FIG. 8 is a schematic diagram of a circuit structure of a sub-pixel. As shown in FIG. 6 and FIG. 7, the data write sub-circuit 02111 includes a data write transistor T1, the drive sub-circuit 02112 includes a drive transistor T3, the adjustment sub-circuit 02113 includes a storage capacitor C1, and the compensation circuit 0212 includes a compensation transistor T2.

On the basis of the structure shown in FIG. 5, it can be seen referring to FIG. 7 that in some embodiments:

A control electrode of the data write transistor T1 is coupled to the first control line Gate1, a first electrode of the data write transistor T1 is coupled to the data line Data, and a second electrode of the data write transistor T1 is coupled to the second node G1.

A control electrode of the drive transistor T3 is coupled to the second node G1, a first electrode of the drive transistor T3 is coupled to one terminal of the shielding circuit 0214, the other terminal of the shielding circuit 0214 is coupled to the first power line VDD, and a second electrode of the drive transistor T3 is coupled to the first node S1.

One terminal of the storage capacitor C1 is coupled to the first node S1, and the other terminal of the storage capacitor C1 is coupled to the second node G1.

A gate electrode of the compensation transistor T2 is coupled to the second control line Gate2, a first electrode of the compensation transistor T2 is coupled to the sensing line Sense, and a second electrode of the compensation transistor T2 is coupled to the first node S1.

On the basis of the structure shown in FIG. 6, it can be seen referring to FIG. 8 that in some embodiments:

A control electrode of the data write transistor T1 is coupled to the first control line Gate1, a first electrode of the data write transistor T1 is coupled to the data line Data, and a second electrode of the data write transistor T1 is coupled to the second node G1.

A control electrode of the drive transistor T3 is coupled to the second node G1, a first electrode of the drive transistor T3 is coupled to the first power line VDD, and a second electrode of the drive transistor T3 is coupled to the first node S1.

One terminal of the storage capacitor C1 is coupled to the first node S1, and the other terminal of the storage capacitor C1 is coupled to the second node G1.

A gate electrode of the compensation transistor T2 is coupled to the second control line Gate2, a first electrode of the compensation transistor T2 is coupled to the sensing line Sense, and a second electrode of the compensation transistor T2 is coupled to one terminal of the shielding circuit 0214, the other terminal of the shielding circuit 0214 is coupled to the first node S1

It can be seen referring to the circuits in FIG. 7 and FIG. 8 that the shielding circuit 0214 in the embodiments of the present disclosure includes a shielding resistor R1. As the shielding resistor can self-fuse to shield the high current in the case that particles occur in the light-emitting element 0213, the shielding resistor is also referred to as a fuse resistor or a high-current-shielding resistor.

It can be seen on this basis that for the structures shown in FIG. 4 to FIG. 8, in the embodiments of the present disclosure, two light-emitting channels are disposed in the light-emitting element 0213 in each sub-pixel 021, and the shielding resistor R1 is disposed in each light-emitting channel. The shielding resistor R1 self-fuses at a specific current to form an open circuit, and thus the dark spot is self-disconnected. Thus, the high current is shielded, the impact of the high current on the product reliability is avoided, and the service life of the product is improved.

In some embodiments, based on the above embodiments, the control electrode of the transistor is the gate electrode, the first electrode is the drain electrode, and the second electrode is the source electrode. On this basis, for the structure shown in FIG. 7, the high-current-shielding resistor is connected in series between the first power line VDD and the drain electrode of the drive transistor T3. For the structure shown in FIG. 8, the high-current-shielding resistor is connected in series between the anode (that is, the first nod S1) of the light-emitting element 0213 and the source electrode of the compensation transistor T2. In some embodiments, the first electrode is the source electrode, and the second electrode is the drain electrode.

In some embodiments, the structures shown in FIG. 7 and FIG. 8 are a 6T2C2R circuit structure (that is, including six transistors, two capacitors, and two resistors). In some embodiments, each set of sub-pixels 02Z is of other circuit structures than the structure shown in the drawings, for example, 7T2C2R.

Figure 9:
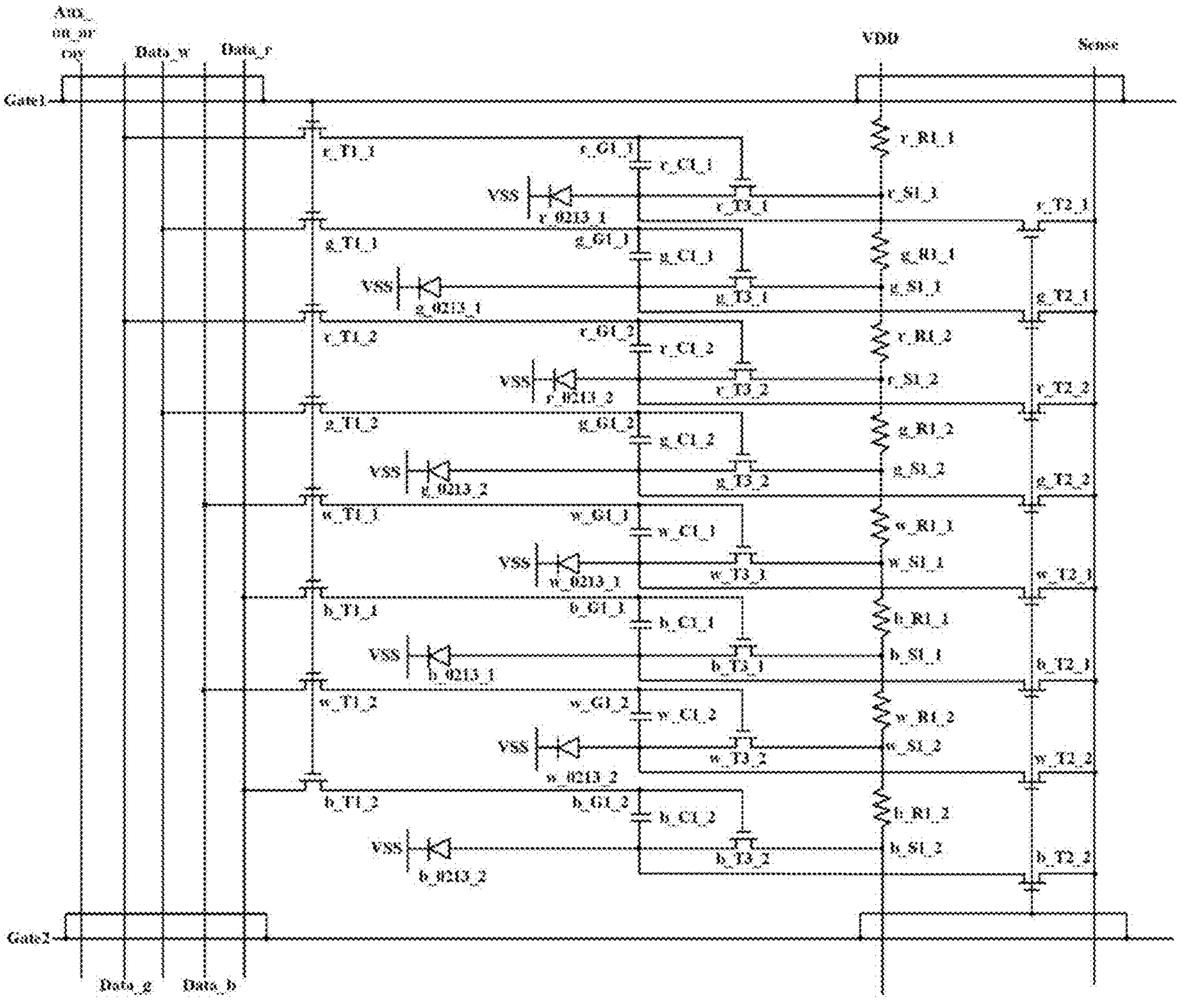
FIG. 9 is a schematic diagram of a circuit structure of a pixel on the basis of FIG. 7.
Figure 10:
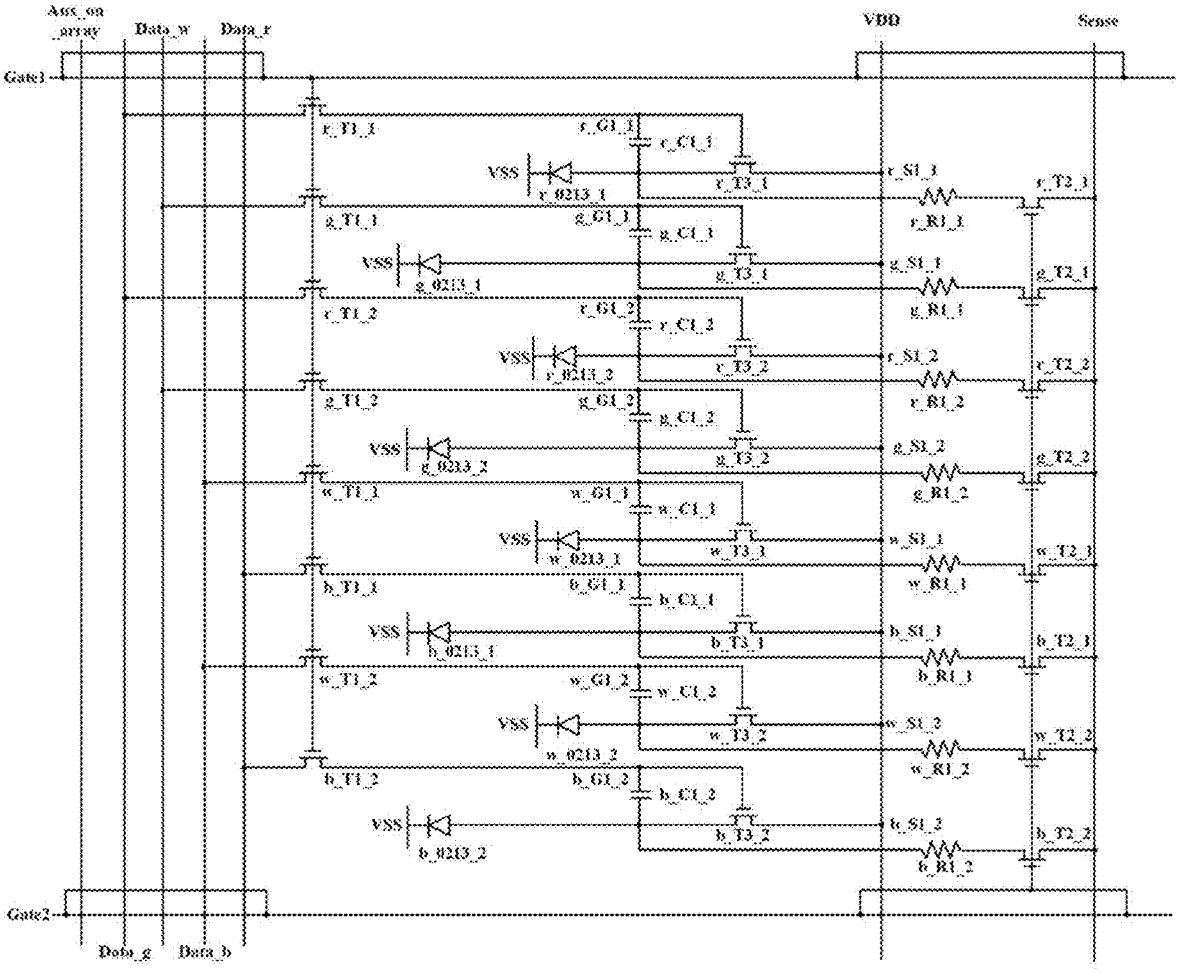
FIG. 10 is a schematic diagram of a circuit structure of a pixel on the basis of FIG. 8.

In some embodiments, using the pixel 02 shown in FIG. 4 including four sets of sub-pixels 02Z, that is, eight sub-pixels 021, and the eight sub-pixels 021 being two red sub-pixels 021R, two green sub-pixels 021G, two blue sub-pixels 021B, and two white sub-pixels 021W as an example, on the basis of the structure shown in FIG. 7, FIG. 9 shows a schematic structural diagram of a pixel in the above embodiments; and on the basis of the structure shown in FIG. 8, FIG. 10 shows a schematic structural diagram of a pixel in the above embodiments.

It can be seen referring to FIG. 9 and FIG. 10 that all sub-pixels 021 of various colors in the pixels 02 are coupled to a same first control line Gate1, coupled to a same second control line Gate2, and coupled to a same power line VDD. That is, two red sub-pixels 021R, two green sub-pixels 021G, two blue sub-pixels 021B, and two white sub-pixels 021W shown in FIG. 4 share the first control line Gate1, the same second control line Gate2, and the power line VDD. In some embodiments, two red sub-pixels 021R, two green sub-pixels 021G, two blue sub-pixels 021B, and two white sub-pixels 021W shown in FIG. 4 share a same second power line VSS. In addition, the sub-pixels 021 of a same color are coupled to a same data line Data, and the sub-pixels 021 of different colors are coupled to different data lines Data. That is, two sub-pixels 021 in each set of sub-pixels 02Z shown in FIG. 4 share a same data line Data, and various sets of sub-pixels 02Z are coupled to different data lines Data.

In addition, it can be seen referring to FIG. 9 and FIG. 10 that the display panel further includes an auxiliary electrode line Aux_on_array, and the auxiliary electrode line Aux_on_array is coupled to the cathode of the light-emitting element 0213 (not shown in the drawings) to reduce the voltage drop (IR drop).

In some embodiments, in conjunction with FIG. 4, the plurality of pixels 02 in the display panel in the embodiments of the present disclosure are arranged in an array of columns and rows. It can be seen in conjunction with FIG. 9 and FIG. 10 that the plurality of sub-pixels 021 in each two adjacent sets of sub-pixels 02Z are arranged alternately. As such, the uniformity of light emission is great.

It should be noted that for distinguishing two sub-pixels 021 in a set of sub-pixels 02Z, in FIG. 5 to FIG. 8, the drive circuits 0211 in two sub-pixels 021 are marked as 0211_1 and 0211_2, the compensation circuits 0212 in two sub-pixels 021 are marked as 0212_1 and 0212_2, the light-emitting elements 0213 in two sub-pixels 021 are marked as 0213_1 and 0213_2, and the shielding circuits 0214 in two sub-pixels 021 are marked as 0214_1 and 0214_2. The data write sub-circuits 02111 in two sub-pixels 021 are marked as 02111_1 and 02111_2, the drive sub-circuits 02112 in two sub-pixels 021 are marked as 02112_1 and 02112_2, and the adjustment sub-circuits 02113 in two sub-pixels 021 are marked as 02113_1 and 02113_2. The data write transistors T1 in two sub-pixels 021 are marked as T1_1 and T1_2, the compensation transistors T2 in two sub-pixels 021 are marked as T2_1 and T2_2, the drive transistors T3 in two sub-pixels 021 are marked as T3_1 and T3_2, the storage capacitors C1 in two sub-pixels 021 are marked as C1_1 and C1_2, the shielding resistors R1 in two sub-pixels 021 are marked as R1_1 and R1_2, the first nodes S1 in two sub-pixels 021 are marked as S1_1 and S1_2, and the second nodes G1 in two sub-pixels 021 are marked as G1_1 and G1_2. In addition, it can be seen referring to FIG. 9 and FIG. 10 that for distinguishing sub-pixels 021 of different colors, the data write transistors T1 in the red sub-pixels 021R are marked as r_T1, the compensation transistors T2 in the red sub-pixels 021R are marked as r_T2, the drive transistors T3 in the red sub-pixels 021R are marked as r_T3, the storage capacitors C1 in the red sub-pixels 021R are marked as r_C1, the shielding resistors R1 in the red sub-pixels 021R are marked as r_R1, the first nodes S1 in the red sub-pixels 021R are marked as r_S1, the second nodes G1 in the red sub-pixels 021R are marked as r_G1, the light-emitting element 0213 in the red sub-pixels 021R are marked as r_0213, and the coupled data line Data in the red sub-pixels 021R are marked as r_Data. For the blue sub-pixels 021B, the green sub-pixels 021G, and the white sub-pixels 021W, the marks of the transistors, the nodes, and the coupled data lines are similar, and thus are not repeated.

Figure 11:
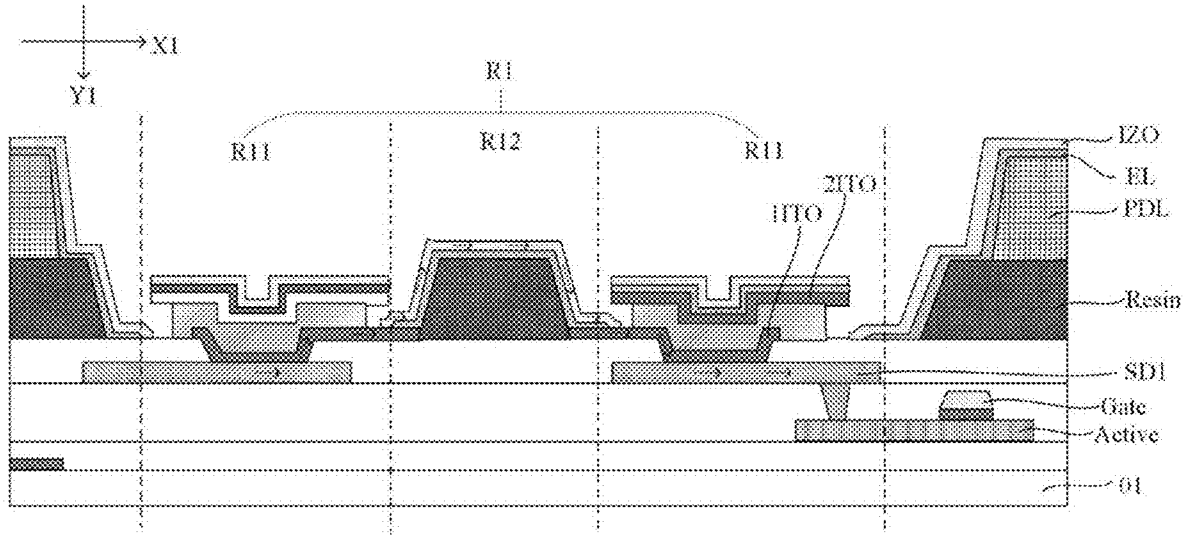
FIG. 11 is a schematic diagram of a film layer of a shielding resistor portion in a display panel according to some embodiments of the present disclosure.

In some embodiments, FIG. 11 is a schematic diagram of a film layer of a shielding resistor R1 portion in a sub-pixel according to some embodiments of the present disclosure. As shown in FIG. 11, in a direction X1 parallel to a bearing face of the substrate 01, at least one terminal of the shielding resistor R1 includes a rib structure, and a recess indented towards a side of the shielding resistor R1 in a direction Y1 perpendicular to the substrate 01 is formed in the rib structure.

In some embodiments, it can be seen referring to FIG. 11 that in the direction X1 parallel to the bearing face of the substrate 01, the shielding resistor R1 includes a first structure R11 and a second structure R12. A distance between a side, away from the substrate 01, of the second structure R12 and the substrate 01 is greater than a distance between a side, away from the substrate 01, of the first structure R11 and the substrate 01. That is, a thickness of the second structure R12 is less than a thickness of the first structure R11.

In some embodiments, it can be seen referring to FIG. 11 that the first structure R11 is disposed on two sides of the second structure R12, and is configured to connect the second structure R12 in series to any of the first light-emitting channel and the second light-emitting channel described above. Correspondingly, the first structure R11 shields one terminal of the shielding resistor R1 from the other terminal of the shielding resistor R1, and the second structure R12 is a connecting line for connecting one terminal of the shielding resistor R1 to the other terminal of the shielding resistor R1.

In some embodiments, it can be seen referring to FIG. 11 that the first structure R11 includes the rib structure in the above embodiments. That is, a recess indented towards a side of the shielding resistor R1 in the direction perpendicular to the substrate 01 is formed in the side, away from the substrate 01, of the first structure R11.

In some embodiments, it can be seen referring to FIG. 11 that a recess indented towards a center of the first structure R11 is formed in each of two sides of the first structure R11.

Illustratively, in the direction perpendicular to the substrate 01, a section of the first structure R11 including the rib structure is in an "I" shape shown in FIG. 11, and a section of the second structure R12 is in a trapezoid shape shown in FIG. 11. In some embodiments, the first structure R11 and the second structure R12 are in other shapes.

In some embodiments, it can be seen referring to FIG. 11 that in the shielding resistor R1, the first structures R11 on two sides of the second structure R12 both include a plurality of first film layers sequentially laminated in a direction away from the substrate 01, and the second structure R12 includes a plurality of second film layers sequentially laminated in the direction away from the substrate 01. At least one of the plurality of first film layers and the plurality of second film layers is disposed on a same layer as a film layer in the sub-pixel 021. In addition, in some embodiments of the present disclosure, a number of the plurality of second film layers is less than a number of the plurality of first film layers. In the plurality of second film layers and the plurality of first film layers, a film layer furthest away from the substrate 01 is a transparent film layer. As such, the transmittance of the display panel is great, and the resistance value of the shielding resistor R1 is larger.

In some embodiments, it can be seen referring to FIG. 11 that the sub-pixel 021 includes a gate metal layer Gate, a source-drain metal layer SD1, a planarization layer Resin, an anode layer Anode, a pixel definition layer PDL, a light-emitting layer EL, and a cathode layer Cathode that are sequentially laminated in the direction away from the substrate 01. The cathode layer Cathode and the anode layer Anode are both made of a transparent material. For example, a transparent material of the cathode layer Cathode includes indium zinc oxide (IZO), and a transparent material of the anode layer Anode includes indium tin oxide (ITO).

Illustratively, in the shielding resistor R1 shown in FIG. 11, the first structure R11 includes five first film layers sequentially laminated in the direction away from the substrate 01. A first first film layer and a third first film layer are made of a same material as the anode layer Anode, that is, made of ITO described in the above embodiments, and thus the first first film layer and the third first film layer are marked as 1ITO and 2ITO in FIG. 11. A second first film layer is made of a same material as the gate metal layer Gate, such as an aluminum alloy material. A fourth first film layer is disposed on a same layer as the light-emitting layer EL, and a fifth first film layer is disposed on a same layer as the cathode layer Cathode. Correspondingly, in the case that the cathode layer Cathode is made of IZO, the fifth first film layer is also made of IZO, and thus the fifth first film layer is marked as IZO in FIG. 11. That is, the film layer furthest away from the substrate 01 in the shielding resistor R1 is an IZO film layer. Accordingly, the resistance value is larger to reliably burn out the particles.

Illustratively, in the shielding resistor R1 shown in FIG. 11, the second structure R12 includes three second film layers sequentially laminated in the direction away from the substrate 01. A first second film layer is disposed on a same layer as the planarization layer Resin, a second second film layer is disposed on a same layer as the light-emitting layer EL, and a third second film layer is disposed on a same layer as the cathode layer Cathode and also marked as IZO similar to description in the above embodiments. Thus, it can be also seen that the film layer furthest away from the substrate 01 in the shielding resistor R1 is the IZO film layer.

In addition, FIG. 11 also shows that the sub-pixel 021 includes an active layer Active, and an insulative layer is disposed between each two adjacent conductive layers (for example, the gate metal layer Gate and the source-drain metal layer SD1) and is not marked. The first structure R11 is lapped with the source-drain metal layer SD1 through a connection hole to be connected to the transistor and connect the second structure R12 in series to the light-emitting channel. The connection hole refers to a hole running through the film layer between the source-drain metal layer SD1 and the first structure R11. For example, in the case that the light-emitting channel is the first light-emitting channel, referring to FIG. 7, the first structure R11 is connected to the source-drain metal layer SD1 in the drive transistor T3 through the connection hole. In the case that the light-emitting channel is the second light-emitting channel, referring to FIG. 8, the first structure R11 is connected to the source-drain metal layer SD1 in the compensation transistor T2 through the connection hole.

That is, in the embodiments of the present disclosure, two ends (that is, the first structure R11) of the shielding resistor R1 are formed by a rib process. In conjunction with FIG. 11, the process principle is described as follows.

First, 1ITO is formed on a side away from the substrate 01 by a patterning process. Then, an aluminum alloy thin film and a 1ITO thin film that are sequentially laminated in a direction away from the 1ITO are formed on a side, away from the substrate 01, of the 1ITO by depositing, and are processed by a one patterning process to form a third first film layer and 2ITO. The whole process does not need additional mask plates and processes. The one patterning process includes photoresist coating, exposing, developing, etching, and photoresist removing, and other processes.

Figure 12:
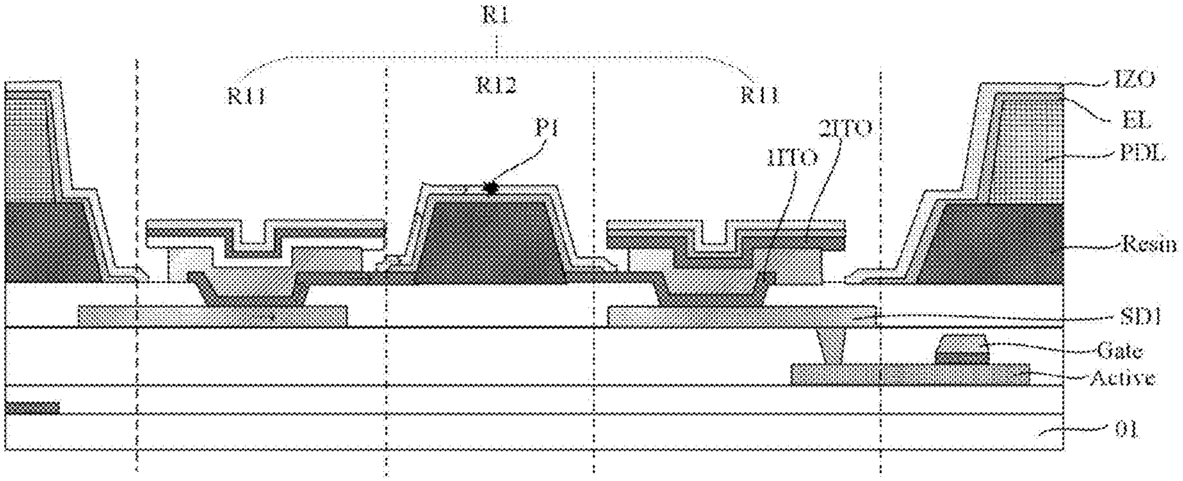
FIG. 12 is a schematic diagram of a burnout position of a dark spot on a shielding resistor on the basis of FIG. 11.

On the basis of the above process, it can be seen in conjunction with FIG. 11 that the rib structure in the "I" shape act as two ends of the shielding resistor R1, such that the 2ITO protrudes relative to other film layer there below and have sharp side corners as shown in FIG. 11. Thus, the subsequently formed light-emitting layer EL is cut off, such that the cathode layer IZO formed on a side, away from the substrate, of the light-emitting layer EL is lapped with the 1ITO. On this basis, in the case that the shielding resistor R1 is burn out, it can be seen from FIG. 12 that the burnout position P1 is on the second structure R12 (that is, the connecting line), or it can be seen from FIG. 13 that the burnout position P1 is on the first structure R11 (that is, two terminals of the shielding resistor), for example, a rib lapping position of the cathode layer IZO and the 1ITO.

It should be noted that being in the same layer refers to the layer structure formed by patterning a film layer that has a specific pattern and formed by a same film forming process by a one patterning process using a same mask. Depending on different specific patterns, the one patterning process includes several exposing processes, developing processes, or etching processes, and the specific pattern in the formed layer structure is continuous or discontinuous. That is, elements, parts, structures and/or portions in the "same layer" are made of a same material and are formed by a one patterning process. As such, the manufacturing process and manufacturing cost are saved, and the manufacturing efficiency is improved.

In summary, the embodiments of the present disclosure provide a display panel. At least one pixel in the display panel includes a plurality of sets of sub-pixels. At least one set of sub-pixels includes a plurality of sub-pixels of a same color, and each sub-pixel includes a drive circuit, a compensation circuit, a light-emitting element, and a shielding circuit. The drive circuit and the compensation circuit control the light-emitting element to emit light. The shielding circuit is connected in series to any of a plurality of light-emitting channels of the light-emitting element to switch off the light-emitting channel in response to a dark spot of the light-emitting element. As such, in conjunction with timing settings, the above circuits are used to reliably address the problem of dark spots in the display panel. Furthermore, in the case that the dark spot occurs in sub-pixels of one color in the pixel, sub pixels of the same other colors are driven to emit light, such that a great display effect is ensured. The product yield of the display panel according to the embodiments of the present disclosure is great.

Figure 14:
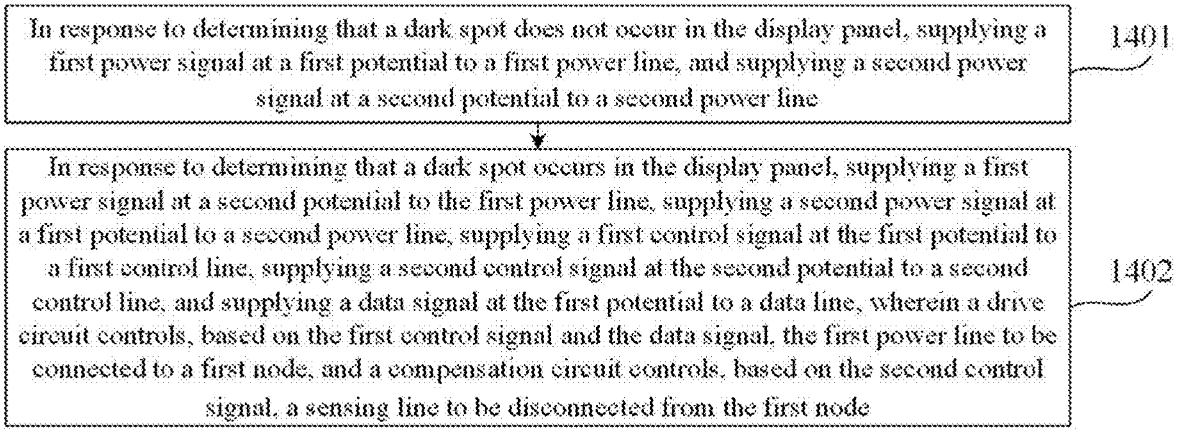
FIG. 14 is a flowchart of a method for controlling a display panel on the basis of FIG. 2.

In some embodiments, using the display panel shown in FIG. 2, FIG. 5, FIG. 7, and FIG. 9, that is, the shielding circuit 0214 in the sub-pixel 021 being connected in series to the first light-emitting channel over which the first power line VDD is coupled to the light-emitting element 0213, as an example, FIG. 14 is a flowchart of a method for controlling a display panel. As shown in FIG. 14, the method includes following processes.

In S1401, in the case that a dark spot does not occur in a display panel, a first power signal at a first potential is supplied to a first power line, and a second power signal at a second potential is supplied to a second power line.

That is, as described in above embodiments, in the case that the dark spot does not occur in the display panel, a forward voltage is loaded on the light-emitting element.

In S1402, in the case that the dark spot occurs in the display panel, a first power signal at a second potential is supplied to the first power line, and a second power signal at a first potential is supplied to a second power line.

That is, as described in above embodiments, in the case that the dark spot occurs in the display panel, a reverse voltage is loaded on the light-emitting element.

In addition, in the case that the dark spot occurs in the display panel, a first control signal at the first potential is supplied to a first control line, a second control signal at the second potential is supplied to a second control line, and a data signal at the first potential is supplied to a data line. A drive circuit controls, based on the first control signal and the data signal, the first power line to be connected to a first node, and a compensation circuit controls, based on the second control signal, a sensing line to be disconnected from the first node. On this basis, the light-emitting element without the particle is not conducted, and the light-emitting element with the particle is conducted abnormally. Furthermore, the current flows from the second power line into the first power line through the first light-emitting channel to form a path. In the case that the current is high, some short particles are burned out, and the dark spot restores to be normal. For some particles with good connectivity that cause the anode to be connected to the cathode, the current is flexibly adjusted and cooperates with the shielding circuit to burn out the particles, and the burnout point is generally the position of the shielding circuit. In other words, the shielding circuit self-fuses in the case that particles occur in the light-emitting element to form an open circuit, and thus the dark spot is self-disconnected.

Figure 15:
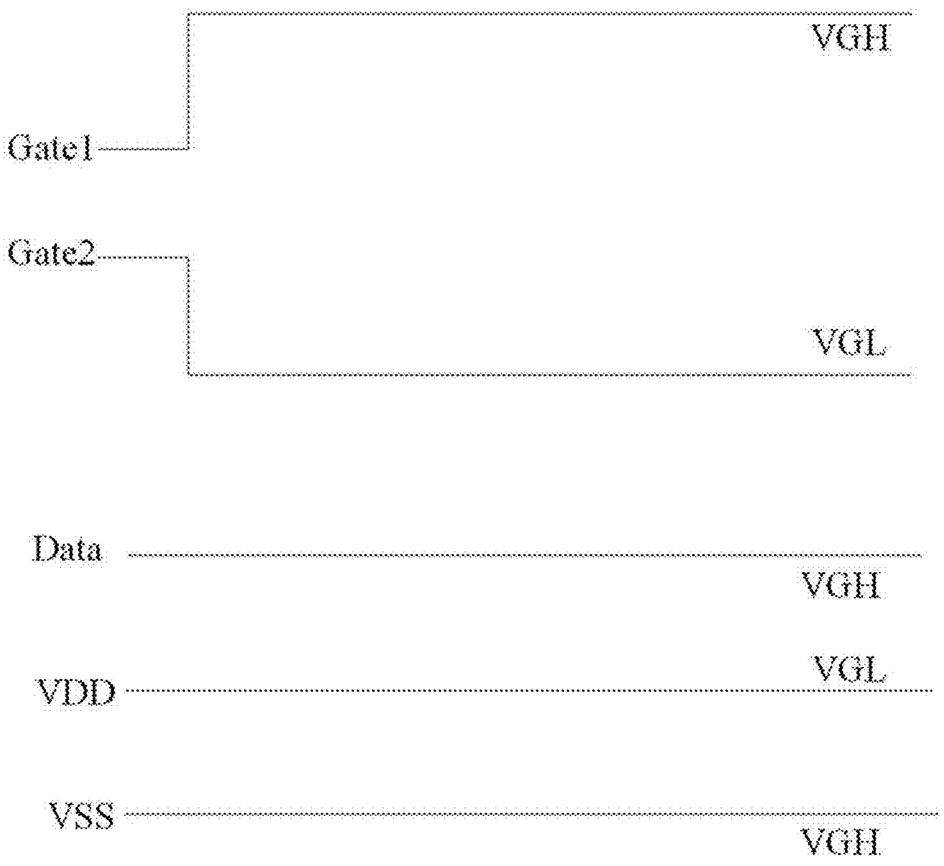
FIG. 15 is a schematic diagram of signal timing of a display panel on the basis of FIG. 14.

Illustratively, using the transistors are all N-type transistors, the first potential is a high potential VGH, and the second potential is a low potential VGL in the structure shown in FIG. 5 as an example, FIG. 15 shows a schematic diagram of timing of signal lines coupled to a sub-pixel in response to a dark spot of a display panel.

Figure 13:
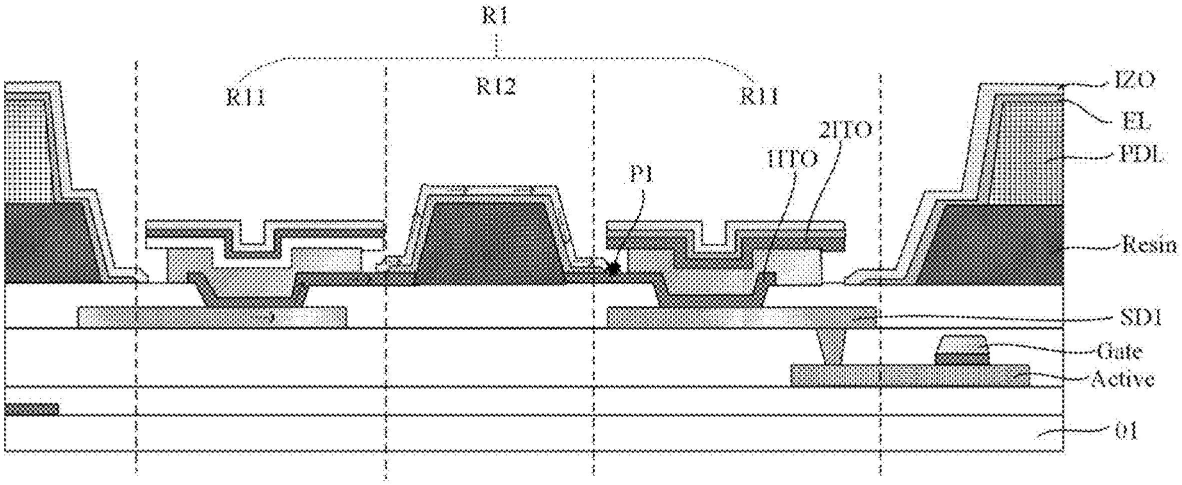
FIG. 13 is a schematic diagram of a burnout position of a dark spot on a shielding resistor on the basis of FIG. 11.

It can be further seen referring to FIG. 13 that in the case that the dark spot occurs in the display panel, the first control signal at the high potential VGH is supplied to the first control line Gate1, the second control signal at the low potential VGL is supplied to the second control line Gate2, and the data signal at the high potential VGH is supplied to the data line Data. Correspondingly, the data write transistors T1 (for example, T1_1 and T1_2 shown in FIG. 5) in the sub-pixels 021 in the set of sub-pixels 02Z are turned on, and the compensation transistors T2 (for example, T2_1 and T2_2 shown in FIG. 5) are turned off. Furthermore, the data signal at the high potential VGH supplied by the data line Data is transmitted to the second node G1 (for example, G1_1 and G1_2 shown in FIG. 5), such that the drive transistors T3 (for example, T3_1 and T3_2 shown in FIG. 5) are turned on. Furthermore, the first power line VDD and the first node S1 (for example, S1_1 and S1_2 shown in FIG. 5) are conducted, and the sensing line Sense and the first node S1 are disconnected. On this basis, the first power signal at the low potential VGL is supplied to the first power line VDD, and the second power signal at the high potential VGH is supplied to the second power line VSS. That is, the potential of the first power line VDD is lowered, and the potential of the second power line VSS is raised. The first power signal at the low potential VGL is transmitted to the first node S1, such that the reverse voltage is loaded on the light-emitting element 0213 (for example, 0213_1 and 0213_2 shown in FIG. 5), that is, the potential of the cathode of the light-emitting element 0213 is higher than the potential of the anode.

Figure 16:
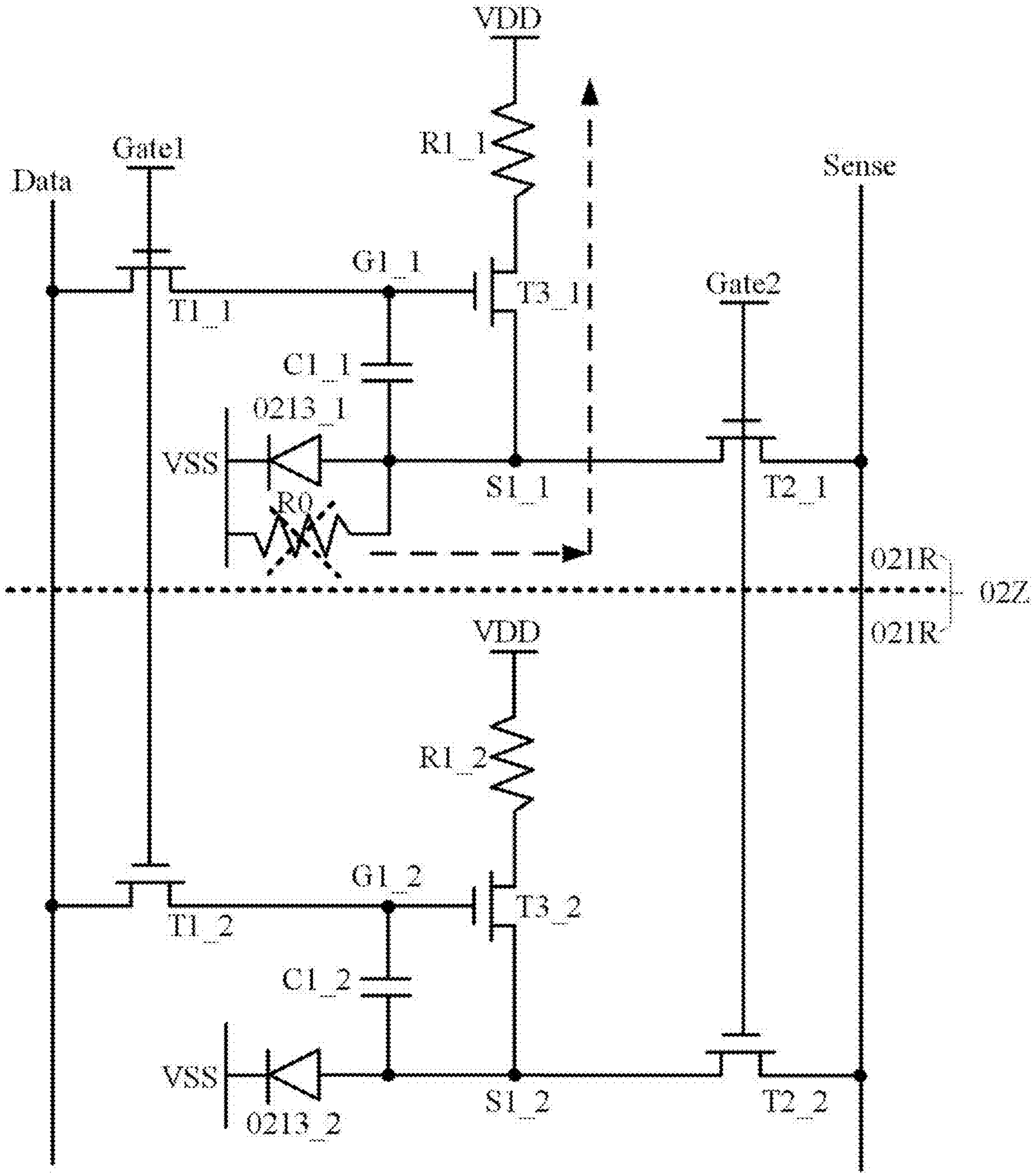
FIG. 16 is a schematic diagram of a burnout position of a dark spot on the basis of FIG. 5.
Figure 17:
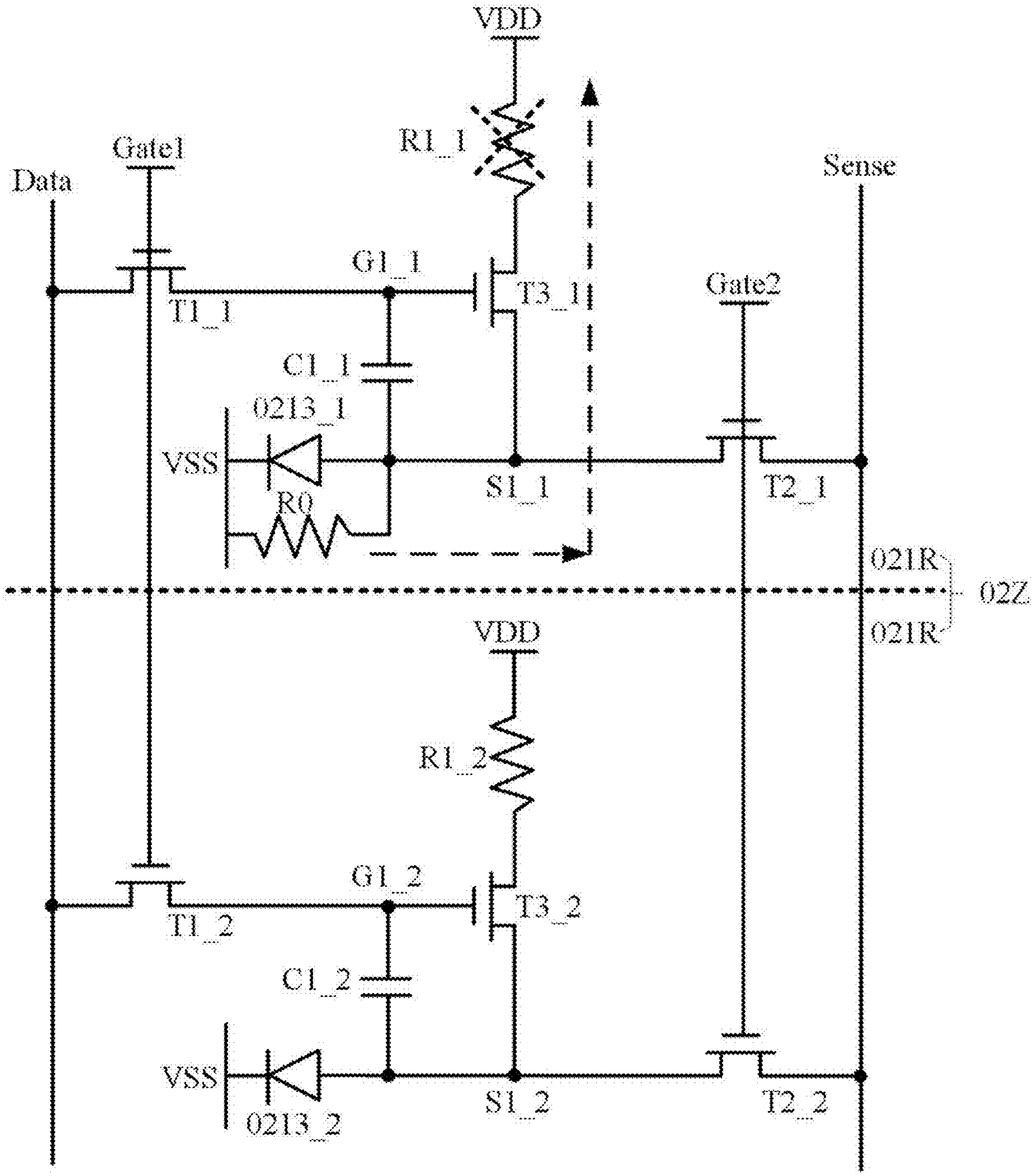
FIG. 17 is a schematic diagram of a burnout position of a dark spot on the basis of FIG. 5.

On this basis, it can be seen referring to FIG. 16 and FIG. 17 that the light-emitting element 0213 without the particle is equivalent to a diode structure and is not conducted, and the light-emitting element 0213 with the particle is conducted, such that the current flows from the second power line VSS into the first power line VDD through the drive transistor T3 to form a path. A current flow can be seen in the dotted arrows shown in FIG. 16 and FIG. 17. In the case that the current is high, referring to FIG. 16, some short particles are burned out, and the dark spot restores to be the normal spot, such that the dark spot is addressed. The burnout position is indicated by the resistor R0 in FIG. 16. For some obstinate particles, referring to FIG. 17, the current is raised to burn out the particles at the shielding resistor R1 form an open circuit, and thus the dark spot is self-disconnected. In some embodiments, it can be seen in conjunction with FIG. 12 that the burnout position P1 of the shielding resistor R1 is in the connecting line. Alternatively, in conjunction with FIG. 13, the burnout position P1 of the shielding resistor R1 is in the rib lapping position.

Figure 18:
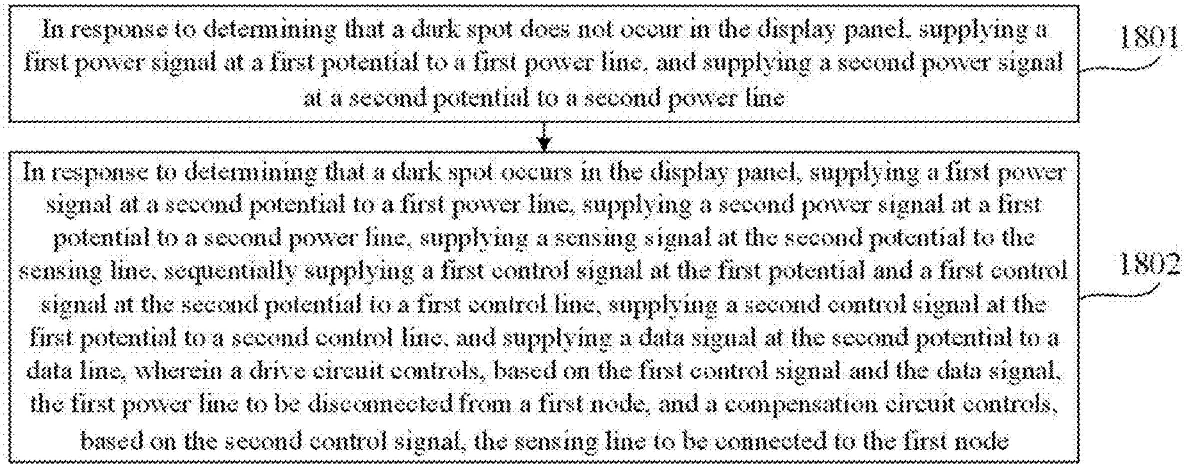
FIG. 18 is a flowchart of a method for controlling a display panel on the basis of FIG. 3.

In some embodiments, using the display panel shown in FIG. 3, FIG. 6, FIG. 8, and FIG. 10, that is, the shielding circuit 0214 in the sub-pixel 021 being connected in series to the second light-emitting channel over which the sensing line Sense is coupled to the light-emitting element 0213, as an example, FIG. 18 is a flowchart of a method for controlling a display panel. As shown in FIG. 18, the method includes following processes.

In S1801, in the case that a dark spot does not occur in a display panel, a first power signal at a first potential is supplied to a first power line, and a second power signal at a second potential is supplied to a second power line.

That is, as described in above embodiments, in the case that the dark spot does not occur in the display panel, a forward voltage is loaded on the light-emitting element.

In S1802, in the case that the dark spot occurs in the display panel, a first power signal at a second potential is supplied to the first power line, and a second power signal at a first potential is supplied to a second power line.

That is, as described in above embodiments, in the case that the dark spot occurs in the display panel, a reverse voltage is loaded on the light-emitting element.

In addition, in the case that the dark spot occurs in the display panel, a sensing signal at the second potential is supplied to the sensing line, a first control signal at the first potential and a first control signal at the second potential are sequentially supplied to a first control line, a second control signal at the first potential is supplied to a second control line, and a data signal at the second potential is supplied to a data line. A drive circuit controls, based on the first control signal and the data signal, the first power line to be disconnected from a first node, and a compensation circuit controls, based on the second control signal, the sensing line to be connected to the first node. On this basis, the light-emitting element without the particle is not conducted, and the light-emitting element with the particle is conducted abnormally. Furthermore, the current flows from the second power line into the sensing line Sense through the second light-emitting channel to form a path. In the case that the current is high, some short particles are burned out, and the dark spot restores to be normal. For some particles with good connectivity that cause the anode to be connected to the cathode, the current is flexibly adjusted and cooperates with the shielding circuit to burn out the particles, and the burnout point is generally the position of the shielding circuit. In other words, the shielding circuit self-fuses in the case that particles occur in the light-emitting element to form an open circuit, and thus the dark spot is self-disconnected.

Figure 19:
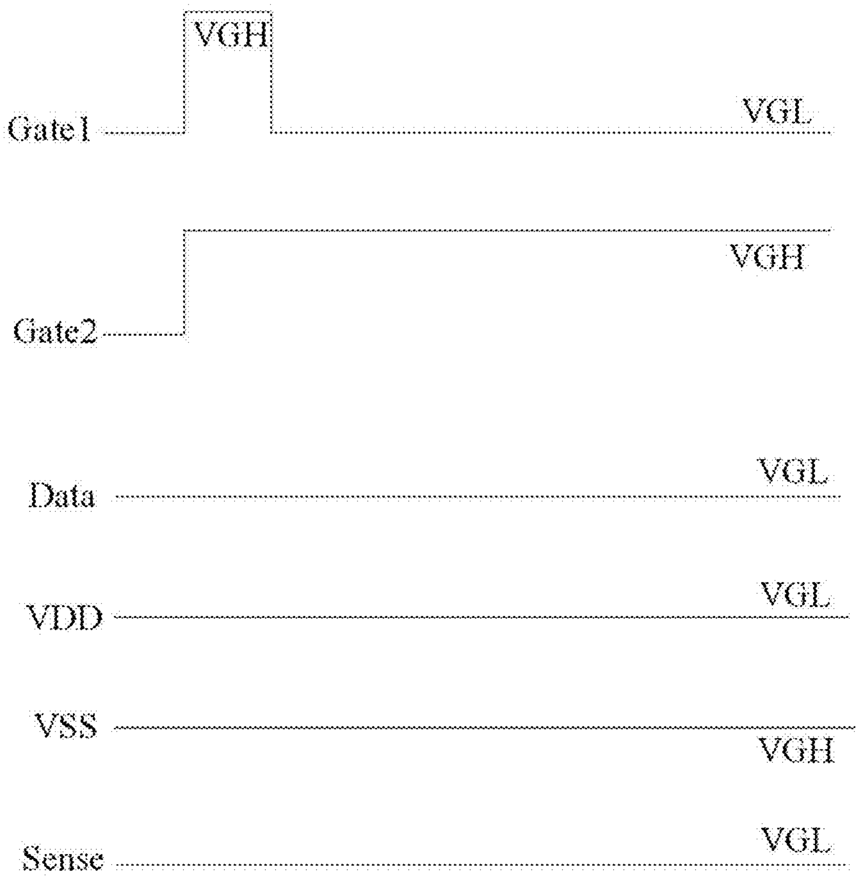
FIG. 19 is a schematic diagram of signal timing of a display panel on the basis of FIG. 18.

Illustratively, using the transistors are all N-type transistors, the first potential is a high potential VGH, and the second potential is a low potential VGL in the structure shown in FIG. 6 as an example, FIG. 19 shows a schematic diagram of timing of signal lines coupled to a sub-pixel in response to a dark spot of a display panel.

It can be further seen referring to FIG. 19 that in the case that the dark spot occurs in the display panel, the first control signal at the high potential VGH and the first control signal at the low potential VGL are sequentially supplied to the first control line Gate1, the second control signal at the high potential VGH is supplied to the second control line Gate2, and the data signal at the low potential VGL is supplied to the data line Data. Correspondingly, the data write transistors T1 (for example, T1_1 and T1_2 shown in FIG. 6) in the sub-pixels 021 in the set of sub-pixels 02Z are turned on and then turned off, and the compensation transistors T2 (for example, T2_1 and T2_2 shown in FIG. 6) are turned on. Furthermore, the data signal at the low potential VGL supplied by the data line Data is transmitted to the second node G1 (for example, G1_1 and G1_2 shown in FIG. 6) in the case that the data write transistors T1 are turned on, such that the drive transistors T3 (for example, T3_1 and T3_2 shown in FIG. 6) are turned off. Furthermore, the sensing line Sense and the first node S1 (for example, S1_1 and S1_2 shown in FIG. 6) are conducted, and the first power line VDD and the first node S1 are disconnected. On this basis, the second power signal at the high potential VGH is supplied to the second power line VSS, and the sensing signal at the low potential VGL is supplied to the sensing line Sense. That is, the potential of the first power line VDD is lowered, and the potential of the sensing line Sense is raised. On the basis of the embodiments, the first power signal at the low potential VGL is supplied to the first power line VDD, that is, the potential of the first power line VDD is lowered. Correspondingly, the sensing signal at the low potential VGL is transmitted to the first node S1, such that the reverse voltage is loaded on the light-emitting element 0213 (for example, 0213_1 and 0213_2 shown in FIG. 6), that is, the potential of the cathode of the light-emitting element 0213 is higher than the potential of the anode.

Figure 20:
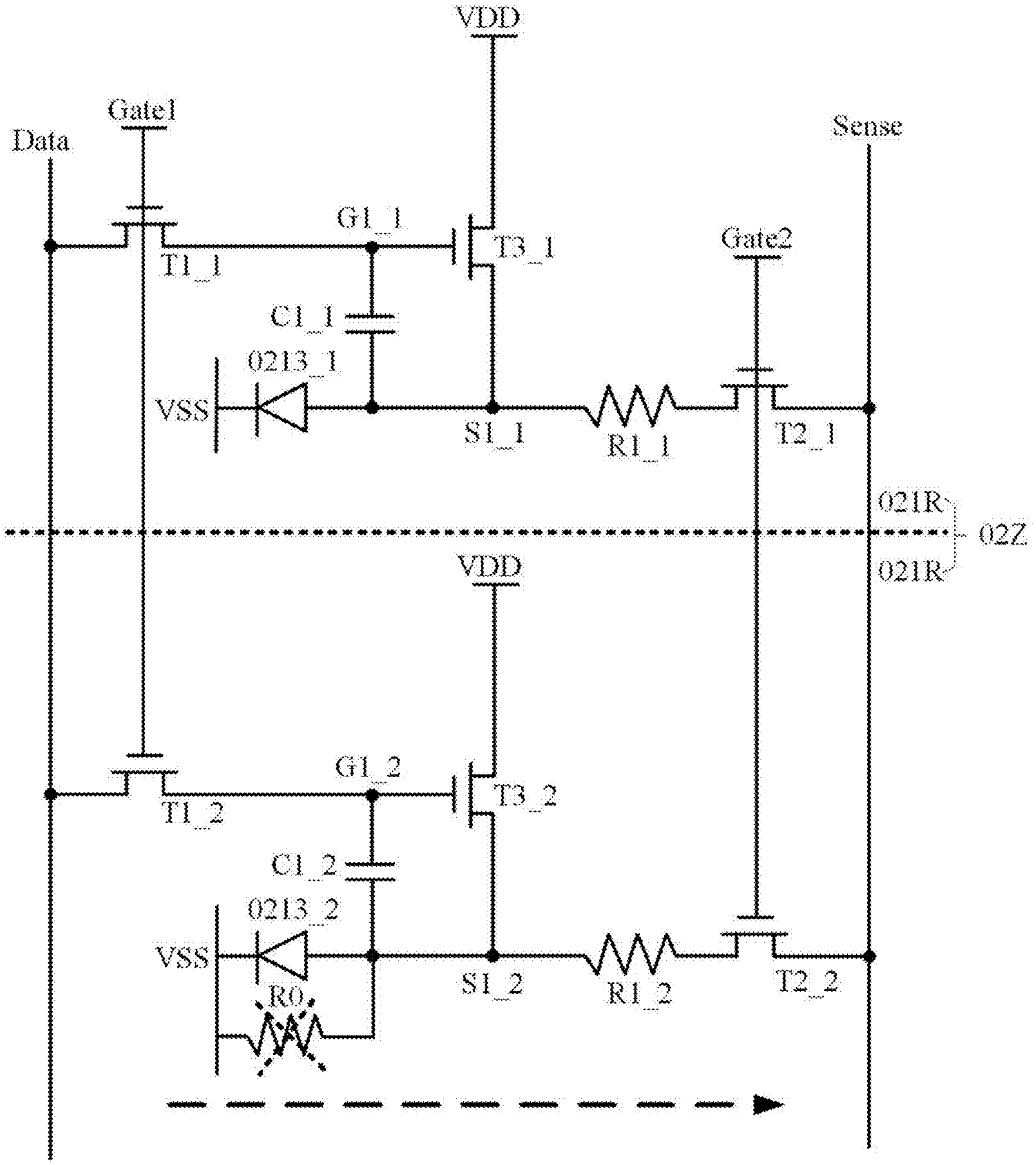
FIG. 20 is a schematic diagram of a burnout position of a dark spot on the basis of FIG. 6.
Figure 21:
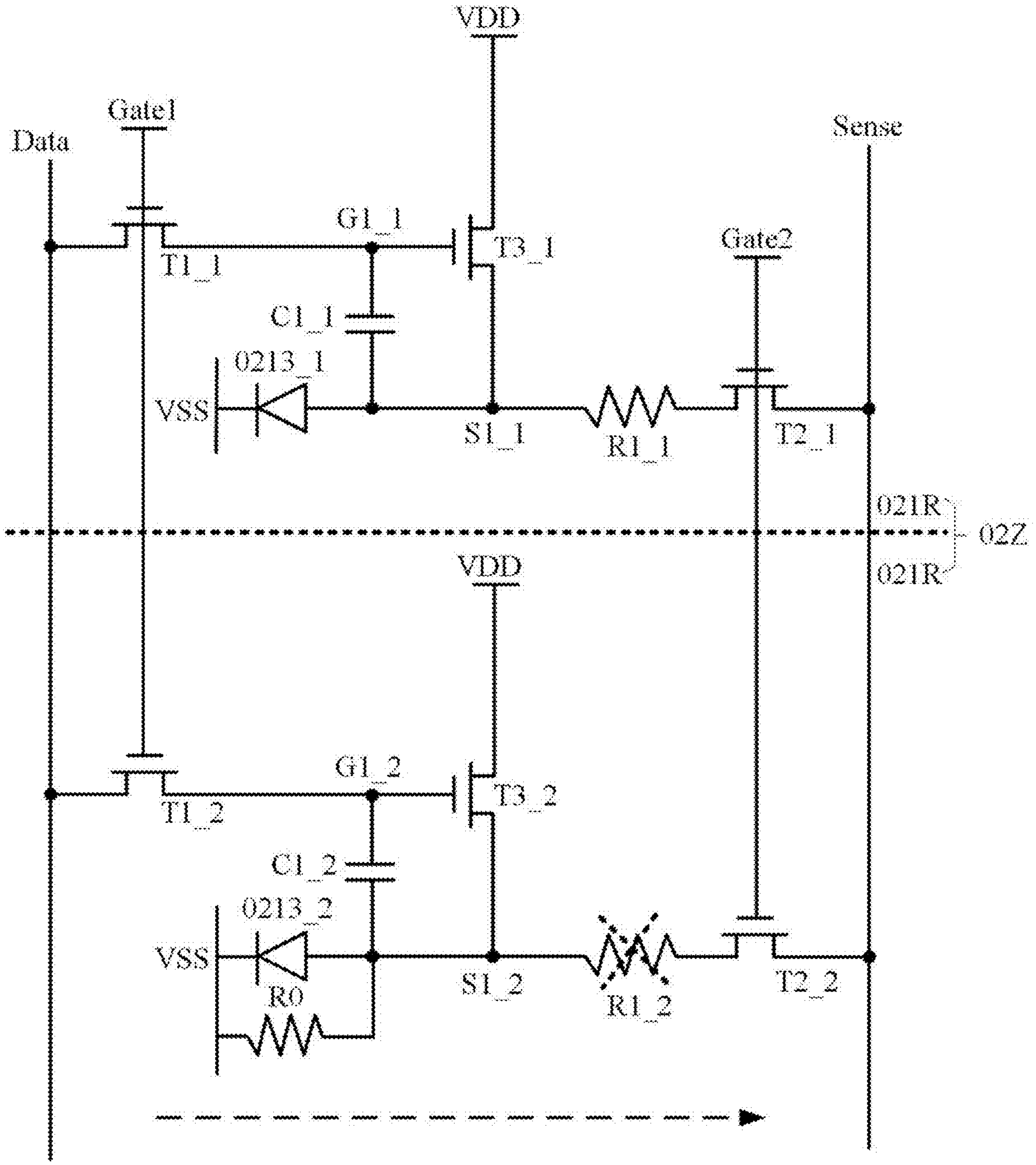
FIG. 21 is a schematic diagram of a burnout position of a dark spot on the basis of FIG. 6.

On this basis, it can be seen referring to FIG. 20 and FIG. 21 that the light-emitting element 0213 without the particle is equivalent to a diode structure and is not conducted, and the light-emitting element 0213 with the particle is conducted, such that the current flows from the second power line VSS into the sensing line Sense through the compensation transistor T2 to form a path. A current flow can be seen in the dotted arrows shown in FIG. 20 and FIG. 21. In the case that the current is high, referring to FIG. 20, some short particles are burned out, and the dark spot restores to be the normal spot, such that the dark spot is addressed. The burnout position is indicated by the resistor R0 in FIG. 16. For some obstinate particles, referring to FIG. 21, the current is raised to burn out the particles at the shielding resistor R1 form an open circuit, and thus the dark spot is self-disconnected. In some embodiments, it can be seen in conjunction with FIG. 12 that the burnout position P1 of the shielding resistor R1 is in the connecting line. Alternatively, in conjunction with FIG. 13, the burnout position P1 of the shielding resistor R1 is in the rib lapping position.

In summary, the embodiments of the present disclosure provide a method for controlling a display panel. At least one pixel in the display panel includes a plurality of sets of sub-pixels. At least one set of sub-pixels includes a plurality of sub-pixels of a same color, and each sub-pixel includes a drive circuit, a compensation circuit, a light-emitting element, and a shielding circuit. In the case that the dark spot occurs in the display panel, an adverse voltage is loaded on the light-emitting element in conjunction with signal timing to cut off the dark spot, and thus the dark spots in the display panel are reliably addressed. Furthermore, in the case that the dark spot occurs in sub-pixels of one color in the pixel, sub pixels of the same other colors are driven to emit light, such that a great display effect is ensured. The product yield of the display panel according to the embodiments of the present disclosure is great.

Figure 22:
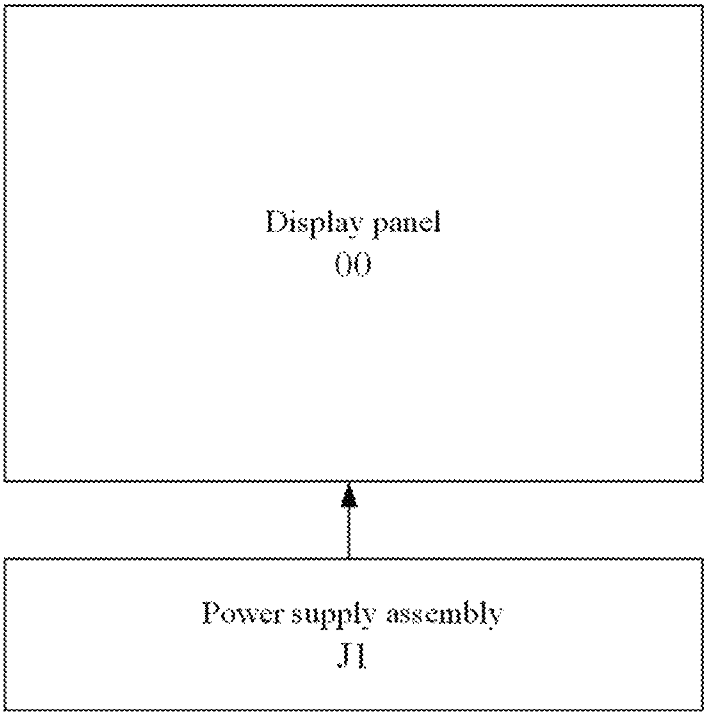
FIG. 22 is a schematic structural diagram of a display device according to some embodiments of the present disclosure.

FIG. 22 is a schematic structural diagram of a display device according to some embodiments of the present disclosure. As shown in FIG. 22, the display device includes a power supply assembly J1, and the display panel 00 in the above embodiments.

The power supply assembly J1 is connected to the display panel 00 and is configured to supply power to the display panel 00.

In some embodiments, the display device according to the embodiments of the present disclosure is an OLED transparent display device, a mobile phone, a tablet computer, a flexible display device, a television, a monitor, or any other products or components with the display function.

It should be noted that in the accompanying drawings, for clarity of the illustration, the dimension of the layers and regions may be scaled up. It should be understood that when an element or layer is described as being "on" another element or layer, the described element or layer may be directly located on other elements or layers, or an intermediate layer may exist. In addition, it should be understood that when an element or layer is described as being "under" another element or layer, the described element or layer may be directly located under other elements, or more than one intermediate layer or element may exist. In addition, it should be further understood that when a layer or element is described as being arranged "between" two layers or elements, the described layer or element may be the only layer between the two layers or elements, or more than one intermediate layer or element may exist. In the whole disclosure, like reference numerals indicate like elements.

The terms used in the embodiments of the present disclosure are only used to explain the embodiments of the present disclosure, and are not intended to limit the present disclosure. Unless otherwise defined, technical or scientific terms used in the present disclosure shall have ordinary meaning understood by persons of ordinary skill in the art to which the disclosure belongs.

For example, the terms "first" and "second" are only intended to describe, and are not intended to indicate or imply relative importance. The term "a plurality of" herein means two or more, unless otherwise defined clearly.

Similarly, the terms "a," "an," and the like are not intended to limit the quantity, and only represent that at least one exists.

The terms "include" or "include" and the like are used to indicate that the element or object preceding the terms covers the element or object following the terms and its equivalents, and shall not be understood as excluding other elements or objects.

The terms "on," "under," "left," and "right" are only used to indicate the relative positional relationship. When the absolute position of the described object changes, the relative positional relationship may change accordingly.

The term "and/or" herein describes associations between associated objects, and indicates three types of relationships. For example, the phrase "A and/or B" means (A), (B), or (A and B). The symbol "/" generally indicates an "or" relationship between the associated objects.

Described above are merely optional embodiments of the present disclosure, and are not intended to limit the present disclosure. Any modifications, equivalent replacements, improvements and the like made within the spirit and principles of the present disclosure should be encompassed within the scope of protection of the present disclosure.

The invention claimed is:

1. A display panel, comprising:

a substrate; and a plurality of pixels on the substrate, wherein at least one of the plurality of pixels comprises a plurality of sets of sub-pixels, at least one set of the plurality of sets of sub-pixels comprising a plurality of sub-pixels of a same color;

wherein each of the plurality of sub-pixels comprises:

a drive circuit, coupled to a first control line, a data line, a first power line, and a first node, and configured to control on or off between the first power line and the first node based on a first control signal supplied by the first control line and a data signal supplied by the data line and to control a potential of the first node based on the data signal and a first power signal supplied by the first power line;

a compensation circuit, coupled to a second control line, a sensing line, and the first node, and configured to control on or off between the sensing line and the first node based on a second control signal supplied by the second control line;

a light-emitting element, coupled to the first node and a second power line, and configured to emit light based on the potential of the first node and a second power signal supplied by the second power line; and a shielding circuit, connected in series to any light-emitting channel, and configured to switch off the light-emitting channel in response to a dark spot of the light-emitting element, wherein the light-emitting channel comprises a first light-emitting channel and a second light-emitting channel, wherein the first light-emitting channel comprises a channel over which the first power line is coupled to the light-emitting element, and the second light-emitting channel comprises a channel over which the sensing line is coupled to the light-emitting element;

wherein the shielding circuit comprises a shielding resistor; and, in a direction parallel to a bearing face of the substrate, at least one terminal of the shielding resistor comprises a rib structure, wherein a recess indented towards a side of the shielding resistor in a direction perpendicular to the substrate is formed in the rib structure.

2. The display panel according to claim 1, wherein the drive circuit comprises:

a data write sub-circuit, coupled to the first control line, the data line, and a second node, and configured to control on or off between the data line and the second node based on the first control signal supplied by the first control line;

a drive sub-circuit, coupled to the second node, the first power line, and the first node, and configured to control on or off between the first power line and the first node based on a potential of the second node and to control the potential of the first node based on the potential of the second node and the first power signal; and an adjustment sub-circuit, coupled to the second node and the first node, and configured to adjust the potential of one of the second node and the first node based on the potential of the other of the second node and the first node;

wherein the first light-emitting channel further comprises the drive sub-circuit.

3. The display panel according to claim 2, wherein the shielding circuit is connected in series between the first power line and the drive sub-circuit.

4. The display panel according to claim 3, wherein the data write sub-circuit comprises: a data write transistor, the drive sub-circuit comprises a drive transistor, the adjustment sub-circuit comprises a storage capacitor, and the compensation circuit comprises a compensation transistor; wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to one terminal of the shielding circuit, the other terminal of the shielding circuit is coupled to the first power line, and a second electrode of the drive transistor is coupled to the first node;

one terminal of the storage capacitor is coupled to the first node, and the other terminal of the storage capacitor is coupled to the second node; and a gate electrode of the compensation transistor is coupled to the second control line, a first electrode of the compensation transistor is coupled to the sensing line, and a second electrode of the compensation transistor is coupled to the first node.

5. The display panel according to claim 2, wherein the second light-emitting channel further comprises the compensation circuit, wherein the shielding circuit is connected in series between the light-emitting element and the compensation circuit.

6. The display panel according to claim 5, wherein the data write sub-circuit comprises: a data write transistor, the drive sub-circuit comprises a drive transistor, the adjustment sub-circuit comprises a storage capacitor, and the compensation circuit comprises a compensation transistor; wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to the first power line, and a second electrode of the drive transistor is coupled to the first node;

one terminal of the storage capacitor is coupled to the first node, and the other terminal of the storage capacitor is coupled to the second node; and a control electrode of the compensation transistor is coupled to the second control line, a first electrode of the compensation transistor is coupled to the sensing line, a second electrode of the compensation transistor is coupled to one terminal of the shielding circuit, and the other terminal of the shielding circuit is coupled to the first node.

7. The display panel according to claim 1, wherein in the direction parallel to the bearing face of the substrate, the shielding resistor comprises a first structure and a second structure, wherein a distance between a side, away from the substrate, of the second structure and the substrate is greater than a distance between a side, away from the substrate, of the first structure and the substrate.

8. The display panel according to claim 7, wherein the first structure is disposed on two sides of the second structure, and is configured to connect the second structure in series to any light-emitting channel; and the first structure comprises the rib structure, and a recess indented towards a center of the first structure is formed in each of two sides of the first structure in the direction parallel to the bearing face of the substrate.

9. The display panel according to claim 7, wherein the first structure comprises a plurality of first film layers sequentially laminated in a direction away from the substrate, and the second structure comprises a plurality of second film layers sequentially laminated in the direction away from the substrate, wherein at least one of the plurality of first film layers and the plurality of second film layers is disposed on a same layer as a film layer in each of the plurality of sub-pixels.

10. The display panel according to claim 9, wherein each of the plurality of sub-pixels comprises a gate metal layer, a source-drain metal layer, a planarization layer, an anode layer, a pixel definition layer, a light-emitting layer, and a cathode layer that are sequentially laminated in the direction away from the substrate, wherein the cathode layer and the anode layer are both made of a transparent material;

the first structure comprises five first film layers, wherein a first first film layer and a third first film layer are made of a same material as the anode layer, a second first film layer is made of a same material as the gate metal layer, a fourth first film layer is disposed on a same layer as the light-emitting layer, and a fifth first film layer is disposed on a same layer as the cathode layer; and the first structure is lapped with the source-drain metal layer through a connection hole; and the second structure comprises three second film layers, wherein a first second film layer is disposed on a same layer as the planarization layer, a second second film layer is disposed on a same layer as the light-emitting layer, and a third second film layer is disposed on a same layer as the cathode layer.

11. The display panel according to claim 1, wherein the plurality of pixels are arranged in an array, and the plurality of sub-pixels in each two adjacent sets of the plurality of sets of sub-pixels are arranged alternately in a pixel column direction.

12. A method for controlling a display panel, applicable to the display panel as defined in claim 1, wherein in the display panel, a shielding circuit in each of a plurality of sub-pixels is connected in series to a first light-emitting channel over which a first power line is coupled to a light-emitting element;

the method comprising:

in response to determining that a dark spot does not occur in the display panel, supplying a first power signal at a first potential to the first power line, and supplying a second power signal at a second potential to a second power line; or in response to determining that a dark spot occurs in the display panel, supplying a first power signal at a second potential to the first power line, supplying a second power signal at a first potential to a second power line, supplying a first control signal at the first potential to a first control line, supplying a second control signal at the second potential to a second control line, and supplying a data signal at the first potential to a data line, wherein a drive circuit controls, based on the first control signal and the data signal, the first power line to be connected to a first node, and a compensation circuit controls, based on the second control signal, a sensing line to be disconnected from the first node.

13. A method for controlling a display panel, applicable to the display panel as defined in claim 1, wherein in the display panel, a shielding circuit in each of a plurality of sub-pixels is connected in series to a first light-emitting channel over which a sensing line is coupled to a light-emitting element;

the method comprising:

in response to determining that a dark spot does not occur in the display panel, supplying a first power signal at a first potential to a first power line, and supplying a second power signal at a second potential to a second power line; or in response to determining that a dark spot occurs in the display panel, supplying a first power signal at a second potential to a first power line, supplying a second power signal at a first potential to a second power line, supplying a sensing signal at the second potential to the sensing line, sequentially supplying a first control signal at the first potential and a first control signal at the second potential to a first control line, supplying a second control signal at the first potential to a second control line, and supplying a data signal at the second potential to a data line, wherein a drive circuit controls, based on the first control signal and the data signal, the first power line to be disconnected from a first node, and a compensation circuit controls, based on the second control signal, the sensing line to be connected to the first node.

14. A display device, comprising: a power supply assembly, and a display panel; wherein the display panel comprises:

a substrate; and a plurality of pixels on the substrate, wherein at least one of the plurality of pixels comprises a plurality of sets of sub-pixels, at least one set of the plurality of sets of sub-pixels comprising a plurality of sub-pixels of a same color;

wherein each of the plurality of sub-pixels comprises:

a drive circuit, coupled to a first control line, a data line, a first power line, and a first node, and configured to control on or off between the first power line and the first node based on a first control signal supplied by the first control line and a data signal supplied by the data line and to control a potential of the first node based on the data signal and a first power signal supplied by the first power line;

a compensation circuit, coupled to a second control line, a sensing line, and the first node, and configured to control on or off between the sensing line and the first node based on a second control signal supplied by the second control line;

a light-emitting element, coupled to the first node and a second power line, and configured to emit light based on the potential of the first node and a second power signal supplied by the second power line; and a shielding circuit, connected in series to any light-emitting channel, and configured to switch off the light-emitting channel in response to a dark spot of the light-emitting element, wherein the light-emitting channel comprises a first light-emitting channel and a second light-emitting channel, wherein the first light-emitting channel comprises a channel over which the first power line is coupled to the light-emitting element, and the second light-emitting channel comprises a channel over which the sensing line is coupled to the light-emitting element;

wherein the power supply assembly is coupled to the display panel and is configured to supply power to the display panel; and wherein the shielding circuit comprises a shielding resistor; and, in a direction parallel to a bearing face of the substrate, at least one terminal of the shielding resistor comprises a rib structure, wherein a recess indented towards a side of the shielding resistor in a direction perpendicular to the substrate is formed in the rib structure.

15. The display device according to claim 14, wherein the drive circuit comprises:

a data write sub-circuit, coupled to the first control line, the data line, and a second node, and configured to control on or off between the data line and the second node based on the first control signal supplied by the first control line;

a drive sub-circuit, coupled to the second node, the first power line, and the first node, and configured to control on or off between the first power line and the first node based on a potential of the second node and to control the potential of the first node based on the potential of the second node and the first power signal; and an adjustment sub-circuit, coupled to the second node and the first node, and configured to adjust the potential of one of the second node and the first node based on the potential of the other of the second node and the first node;

wherein the first light-emitting channel further comprises the drive sub-circuit.

16. The display device according to claim 15, wherein the shielding circuit is connected in series between the first power line and the drive sub-circuit.

17. The display device according to claim 16, wherein the data write sub-circuit comprises: a data write transistor, the drive sub-circuit comprises a drive transistor, the adjustment sub-circuit comprises a storage capacitor, and the compensation circuit comprises a compensation transistor; wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to one terminal of the shielding circuit, the other terminal of the shielding circuit is coupled to the first power line, and a second electrode of the drive transistor is coupled to the first node;

one terminal of the storage capacitor is coupled to the first node, and the other terminal of the storage capacitor is coupled to the second node; and a gate electrode of the compensation transistor is coupled to the second control line, a first electrode of the compensation transistor is coupled to the sensing line, and a second electrode of the compensation transistor is coupled to the first node.

18. The display device according to claim 15, wherein the second light-emitting channel further comprises the compensation circuit, wherein the shielding circuit is connected in series between the light-emitting element and the compensation circuit.

19. The display device according to claim 18, wherein the data write sub-circuit comprises: a data write transistor, the drive sub-circuit comprises a drive transistor, the adjustment sub-circuit comprises a storage capacitor, and the compensation circuit comprises a compensation transistor; wherein a control electrode of the data write transistor is coupled to the first control line, a first electrode of the data write transistor is coupled to the data line, and a second electrode of the data write transistor is coupled to the second node;

a control electrode of the drive transistor is coupled to the second node, a first electrode of the drive transistor is coupled to the first power line, and a second electrode of the drive transistor is coupled to the first node;

one terminal of the storage capacitor is coupled to the first node, and the other terminal of the storage capacitor is coupled to the second node; and a control electrode of the compensation transistor is coupled to the second control line, a first electrode of the compensation transistor is coupled to the sensing line, a second electrode of the compensation transistor is coupled to one terminal of the shielding circuit, and the other terminal of the shielding circuit is coupled to the first node.

20. The display device according to claim 14, wherein in the direction parallel to the bearing face of the substrate, the shielding resistor comprises a first structure and a second structure, wherein a distance between a side, away from the substrate, of the second structure and the substrate is greater than a distance between a side, away from the substrate, of the first structure and the substrate.

* * * * *